United States Patent
Gaddam et al.

(10) Patent No.: US 6,664,306 B2
(45) Date of Patent: Dec. 16, 2003

(54) CROSSLINKABLE POLYMERIC COMPOSITIONS AND USE THEREOF

(75) Inventors: Babu N. Gaddam, Woodbury, MN (US); Steven M. Hellmann, Afton, MN (US); Ahmed S. Abuelyaman, Woodbury, MN (US); Maureen A. Kavanagh, Stanchfield, MN (US); Duane D. Fansler, Dresser, WI (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/200,673

(22) Filed: Jul. 22, 2002

(65) Prior Publication Data

US 2003/0134930 A1 Jul. 17, 2003

Related U.S. Application Data

(62) Division of application No. 09/657,742, filed on Sep. 8, 2000, now Pat. No. 6,448,301.

(51) Int. Cl.⁷ .................................................. C08F 2/46
(52) U.S. Cl. ................ 522/6; 522/8; 522/35; 522/904; 522/150; 522/153; 522/157; 522/178; 522/182; 522/184; 522/114; 522/113; 522/120; 522/121; 522/125; 526/328; 526/328.5; 427/508; 427/487; 427/516; 427/207.1
(58) Field of Search ...................... 522/1, 6, 8, 35, 522/904, 150, 153, 157, 178, 182, 104, 114, 113, 120, 121, 122, 125; 526/328, 328.5; 427/508, 516, 207.1, 487

(56) References Cited

U.S. PATENT DOCUMENTS

| | | |
|---|---|---|
| 2,803,656 A | 8/1957 | Ahlbrecht et al. |
| RE24,906 E | 12/1960 | Ulrich |
| 3,879,353 A | 4/1975 | Crawford |
| 4,181,752 A | 1/1980 | Martens et al. |
| 4,243,500 A | 1/1981 | Glennon |
| 4,329,384 A | 5/1982 | Vesley et al. |
| 4,330,590 A | 5/1982 | Vesley |
| 4,343,919 A | 8/1982 | Tefertiller et al. |
| 4,364,972 A | 12/1982 | Moon |
| 4,391,687 A * | 7/1983 | Vesley ............... 525/330.5 |
| 4,477,326 A | 10/1984 | Lin |
| 4,507,466 A | 3/1985 | Tomalia et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,594,400 A | 6/1986 | Kvita et al. |
| 4,631,337 A | 12/1986 | Tomalia et al. |
| 4,665,106 A | 5/1987 | Ohta et al. |
| 4,694,064 A | 9/1987 | Tomalia et al. |
| 4,713,975 A | 12/1987 | Tomalia et al. |
| 4,737,550 A | 4/1988 | Tomalia |
| 4,758,611 A | 7/1988 | Beers |
| 4,812,541 A | 3/1989 | Mallya et al. |
| 4,857,599 A | 8/1989 | Tomalia et al. |
| 4,871,779 A | 10/1989 | Killat et al. |
| 4,908,229 A | 3/1990 | Kissel |
| 5,118,779 A | 6/1992 | Szycher |
| 5,122,567 A | 6/1992 | Spada et al. |
| 5,202,361 A | 4/1993 | Zimmerman et al. |
| 5,274,063 A | 12/1993 | Matsumoto et al. |
| 5,391,406 A | 2/1995 | Ramharack et al. |
| 5,418,301 A * | 5/1995 | Hult et al. ............ 525/437 |
| 5,506,279 A | 4/1996 | Babu et al. |
| 5,527,925 A | 6/1996 | Chabrecek et al. |
| 5,552,452 A | 9/1996 | Khadem et al. |
| 5,663,247 A * | 9/1997 | Sorensen et al. ....... 525/533 |
| 5,723,511 A * | 3/1998 | Kazmaier et al. ........ 522/35 |
| 5,723,513 A | 3/1998 | Bonham et al. |
| 5,731,095 A | 3/1998 | Milco et al. |

(List continued on next page.)

FOREIGN PATENT DOCUMENTS

| | | |
|---|---|---|
| DE | 23 36 517 | 2/1975 |
| DE | 37 10 698 A1 | 1/1988 |
| EP | 0 105 666 | 4/1984 |
| JP | 58-46236 | 10/1993 |
| WO | WO 83/01617 | 5/1983 |
| WO | WO 93/16131 | 8/1993 |
| WO | WO 95/10552 | 4/1995 |
| WO | WO 96/24644 | 8/1996 |
| WO | WO 97/05101 | 2/1997 |
| WO | WO 97/24376 | 7/1997 |

OTHER PUBLICATIONS

W. R. Sorenson et al., "Preparative Methods of Polymer Chemistry", (1968), p. 209, 2nd Edition, Interscience Publishers, John Wiley & Sons, New York.

"Free Radical Copolymerization Reactivity Ratios", Polymer Handbook, edited by J. Brandrup and E. H. Immergut, (1989), pp. 209–277, 3rd Edition, Wiley–Interscience Publication, John Wiley & Sons, New York.

G. P. Gladyshev et al., Polymerization at Advanced Degrees of Conversion, (1970), Israel Program for Scientific Translations, Jerusalem.

U.S. patent application Ser. No. 09/858,253, May 15, 2001, Fibrous Films and Articles From Microlayer Substrates.

*Primary Examiner*—James J. Seidleck
*Assistant Examiner*—Sanza L. McClendon
(74) *Attorney, Agent, or Firm*—Kent S. Kokko

(57) ABSTRACT

This invention relates to polymeric compositions that are processible and may be photochemically cured to produce crosslinked compositions useful in coating, sealants and adhesive applications. The crosslinkable composition comprises a first component having a plurality of pendent, free-radically polymerizable functional groups; a polymeric photoinitiator, and a residual content of less than 2%. The composition is melt processable at temperatures of less than or equal to 100° C.

24 Claims, No Drawings

U.S. PATENT DOCUMENTS

| | | |
|---|---|---|
| 5,741,543 A | 4/1998 | Winslow et al. |
| 5,886,064 A * | 3/1999 | Rheinberger et al. ....... 523/116 |
| 5,902,836 A | 5/1999 | Bennett et al. |
| 5,969,079 A | 10/1999 | Lubowitz et al. |
| 6,007,833 A | 12/1999 | Chudzik et al. |
| 6,060,578 A | 5/2000 | Yezrielev et al. |
| 6,093,777 A * | 7/2000 | Sorensen et al. ........... 525/438 |
| 6,103,302 A | 8/2000 | Minamizaki et al. |
| 6,288,208 B1 * | 9/2001 | Moshinsky ................. 528/332 |
| 6,300,388 B1 * | 10/2001 | Verdonck et al. ........... 522/173 |
| 6,310,115 B1 * | 10/2001 | Vanmaele et al. ............ 522/25 |
| 6,448,301 B1 | 9/2002 | Gaddam et al. |
| 6,448,337 B1 * | 9/2002 | Gaddam et al. ............ 525/193 |
| 6,468,451 B1 | 10/2002 | Perez et al. |

* cited by examiner

CROSSLINKABLE POLYMERIC COMPOSITIONS AND USE THEREOF

This application is a divisional of U.S. Ser. No. 09/657,742, filed Sep. 8, 2000 now U.S. Pat. No. 6,448,301, now allowed, the disclosure of which is herein incorporated by reference.

TECHNICAL FIELD OF THE INVENTION

This invention relates to polymeric compositions that are processible and may be photochemically cured to produce crosslinked compositions useful in coating, sealants, adhesive and many other applications

BACKGROUND OF THE INVENTION

For coating, sealant and adhesive applications, much research has focused on acrylic pressure sensitive adhesives (PSAs), which exhibit good adherence to high energy (i.e., polar) substrates such as metal and painted steel surfaces and which have good performance properties at high temperatures (i.e., 100° C. or greater), are known in the art. Crosslinking acrylic compositions to form crosslinked PSAs are an area of much interest and research.

Solvent-processed acrylic PSA compositions can be crosslinked through the addition of polyfunctional crosslinking agents that react with functionalities within the polymer. See, e.g., Japanese Kokoku No. 58[1983]-046236. However, such processes result in the emission of solvent vapors.

The difficulty of additional processing steps, necessary to incorporate polyfunctional crosslinking agents into acrylic PSAs, can be avoided by the use of latent crosslinking reactions. This technique is exemplified in U.S. Pat. No. 4,812,541, where synergistic amounts of an N-vinyl lactam monomer and a glycidyl monomer are incorporated into an acrylate polymer to provide a high performance PSA; however, these latent crosslinked polyacrylates require post-curing that requires additional heat and/or time. Pendent functional group-containing polymers are also described in U.S. Pat. Nos. 4,908,229, 5,122,567, and 5,274,063.

The problems associated with solvent processing and crosslinking bulk-processed acrylate PSAs can be avoided through the use of actinic radiation processing. PSAs made by photopolymerizing an alkyl acrylate and a polar copolymerizable monomer (e.g., acrylic acid, N-vinyl pyrrolidone, etc.) are known in the art. See, e.g., U.S. Pat. Nos. RE 24,906, 4,181,752, 4,364,972, and 4,243,500. The cohesive strength of an acrylic PSA prepared in this manner can be increased if a photoactive crosslinking agent such as an aldehyde, a quinone, or a chromophore-substituted halomethyl-s-triazine is used in conjunction with a photoinitiator. See, e.g., U.S. Pat. Nos. 4,329,384, 4,330,590, 4,391,687, and 5,202,361. However, this type of photo-crosslinking process is affected by the thickness of the composition.

In addition to actinic radiation processing, acrylate PSAs can be applied to substrates by solvent and hot-melt coating techniques. Although solvent coating techniques are widely used, hot-melt coating techniques provide some environmental and economical advantages. However, unlike solvent coating techniques where the polymer coating and crosslinking are performed simultaneously, hot-melt coating requires that coating and crosslinking be performed sequentially. This is due to competing considerations a polymer cannot be hot-melt coated effectively if it is crosslinked, yet the polymer needs to be crosslinked to achieve certain desirable performance properties (e.g., cohesive strength where the polymer is a PSA). Therefore, hot-melt coating is performed prior to crosslinking of the coated polymer.

Because hot-melt coating techniques involve high amounts of thermal energy and shear, the subsequent crosslinking procedure usually involves non-thermal energy sources. Electron beam (E-beam) and ultraviolet (UV) energy sources have been used traditionally, although E-beam techniques often are too energy intensive to be practical. Accordingly, much interest has been focused on UV radiation techniques.

U.S. Pat. No. 5,741,543 (Winslow et al.) describes a syrup polymer process in which a composition containing monomers is coated onto a substrate and crosslinked so as to form a PSA by means of polymerizing free radically polymerizable monomers from covalently attached pendent unsaturation in the polymer component of the composition. The coating can be carried out by a wide variety of industrial methods because the process of the invention allows for compositions with a wide degree of possible viscosities.

SUMMARY OF THE INVENTION

Briefly, the present invention provides novel melt-processible compositions prepared from a first polymer having a plurality of pendent polymerizable functional groups and a polymeric photoinitiator. The composition may further comprise a second component with co-reactive pendent polymerizable groups. The functional groups are reactive by free-radical addition (e.g. free radical addition to a carbon-carbon double bond). In addition, reactions involving polymeric reactants of the instant invention are controlled and precise in that they result in polymer-polymer coupling reactions only by reaction between the pendent free-radically polymerizable functional groups. The novel composition has been discovered to provide low shrinkage, low residual compositions whose properties are easily tailored to the desired end-uses. Residuals include monomers, solvents, or other volatile components.

In one aspect this invention provides crosslinkable composition comprising a) a first component having a plurality of pendent free-radically polymerizable functional groups;

b) a polymeric photoinitiator, and c) a residual content of less than 2.0 wt. %, preferably less than 1.0 wt. %, most preferably less than 0.1 wt. %, wherein said composition is melt processible at temperatures of less than or equal to 100° C.

The first component is selected from:

1) a first polymer having a plurality of pendent polymerizable functional groups, and 2) a first polyfunctional compound having a plurality of pendent polymerizable functional groups.

The composition may further comprise a second component that may be selected from a second polymer having a plurality of pendent polymerizable functional groups, and a second polyfunctional compound having a plurality of pendent polymerizable functional groups.

In another aspect this invention provides a UV crosslinkable composition that produces no or minimal by-products, and that achieves crosslink density by chain-growth addition. This invention has several advantages. The composition is low in viscosity, readily melt processible and coatable, and has minimal residuals content such as solvents, monomers, plasticizers and/or viscosity modifiers. The compositions can rapidly and reliably be prepared without requiring specialized equipment and without generating concerns about potentially toxic or irritating unreacted low molecular weight monomeric species.

The compositions may be used as coatings, including hard surface coatings, clear coatings, powder coatings and pattern coatings; as adhesives, including pressure sensitive adhesives and hot melt adhesives; as sealants; as optical coatings; as blown microfibers (BMF); as high refractive index optical materials; as barrier films; in microreplication; as low adhesion backsizes, (LABs) and as release coatings.

As used herein, the term "melt processible" or simply "processible" is used to refer to polymer compositions that possess or achieve a suitable low viscosity for coating or extrusion at temperatures less than or equal to 100° C., using conventional extrusion equipment without the need for addition of solvents, monomers, plasticizers and/or viscosity modifiers and without the need for extraordinary pressures.

The crosslinked compositions are useful as adhesives, including pressure sensitive adhesives, as sealants, as foams and as coatings. In one embodiment the invention provides an adhesive article comprising the crosslinked composition coated on a substrate, such as a tape backing. The novel compositions of the present invention cure by means of polymerizable functional groups to form crosslinked compositions possessing tailorable properties such as shear, peel, release and strength through selection of the particular constituents, and by control of the crosslink density. The crosslink density is predetermined by the percentage of free-radically polymerizable functional groups incorporated into the crosslinkable composition.

In another aspect this invention provides a process for making a substrate bearing a coating of a crosslinked composition (such as a pressure-sensitive adhesive) on at least one surface thereof, comprising the steps of:

a) coating the crosslinkable composition of the invention onto a substrate, and b) subjecting said coated crosslinkable composition to sufficient energy to activate said initiator and to crosslink said composition.

For performance, environmental, and economic considerations, photoinitiated polymerization is a particularly desirable method for preparing a pressure sensitive adhesive (psa) directly on the tape backing (or release liner in the case of a so-called transfer tape in which the psa is ultimately transferred to a substrate instead of a tape backing to provide for adhesion of the bonded article or adherend). With this bulk polymerization technique, it is advantageous to create a composition having coatable viscosity of 50,000 centipoise or less (when measured at or below 100° C.), coat the composition on the substrate, then crosslink the components to build strength and adhesive properties.

Advantageously, the present invention provides crosslinkable compositions that are readily processed without appreciable residual content (as in syrup polymer compositions). Curable systems containing monomeric species or solvent can give rise to a significant increase in density when transformed from the uncured to the cured state causing a net shrinkage in volume. As is well known, shrinkage can cause a general loss of adhesion in many instances as well as significant movement and unpredictable registration in precise bonding operations such as those required in microcircuit applications.

The composition of the present invention minimizes shrinkage due to solvent evaporation and/or monomer polymerization. The low shrinkage compositions of this invention are particularly useful in dental, molding applications or in any application where accurate molding and/or registration is required. The present invention provides a new class of reactive polymers that may be formulated as 100% solids, cured by photochemical means and that exhibit properties that meet or exceed those of solvent-borne or syrup polymers. The present invention provides compositions that exhibit less than 2% shrinkage, and preferably less than 1%.

Further, the purity of the materials and clean environment for processing are also important to produce high performance materials. Polymers used for coatings and adhesives are often desirably delivered without significant amounts of volatile materials (such as monomeric species) to eliminate any contamination. However, the problems of residual volatile materials constitute a much more formidable challenge especially when acceptable limits of migratable, volatile impurities are on the order of a few parts per million. Industries such as medical and food packaging require materials of high purity and lower cost. The composition of the present invention avoids problems due to species contamination.

DETAILED DESCRIPTION OF THE INVENTION

The present invention provides crosslinkable compositions useful in the preparation of adhesives, coatings and sealants. The compositions are prepared from polymers having free-radically polymerizable, pendent functional groups and are formed from ethylenically unsaturated monomers. The compositions comprise a crosslinkable mixture comprising:

a) a first component having a plurality of pendent free-radically polymerizable functional groups;

b) a polymeric photoinitiator, and c) a residual content of less than 2.0 wt. %, preferably less than 1.0 wt. %, most preferably less than 0.1 wt. %, wherein said composition is melt processible at temperatures of 100° C. or less.

The first component is selected from:

1) a first polymer having a plurality of pendent polymerizable functional groups, and 2) a first polyfunctional compound having a plurality of pendent polymerizable functional groups.

The first polymer comprises a polymer of at least 500 $M_n$ comprising:

1) from 0.01 to 99.99 parts by weight of polymerized units of free radically polymerizable ethylenically-unsaturated monomers, and 2) from 99.99 to 0.01 parts by weight of a polymerized monomer units derived from an ethylenically-unsaturated monomer possessing polymerizable functional groups.

The free radically polymerizable ethylenically-unsaturated monomers of the first polymer (having a plurality of pendent polymerizable functional groups) may comprise any of the free radically polymerizable ethylenically-unsaturated monomers, examples of which include one or more of the vinyl aromatic monomers such as styrene, α-methylstyrene, 2- and 4-vinyl pyridine, and the like; α,β-unsaturated carboxylic acids and their derivatives such as acrylic acid, methacrylic acid, itaconic acid, maleic acid, fumaric acid, crotonic acid, methyl methacrylate, butyl methacrylate, 2-ethylhexyl methacrylate, ethyl acrylate, butyl acrylate, iso-octyl acrylate, octadecyl acrylate, cyclohexyl acrylate, tetrahydrofurfuryl methacrylate, phenyl acrylate, phenethyl acrylate, benzyl methacrylate, β-cyanoethyl acrylate, maleic anhydride, diethyl itaconate, acrylamide, methacrylonitrile, N-butylacrylamide, and the like; vinyl esters of carboxylic acids such as vinyl acetate, vinyl 2-ethylhexanoate, and the like; vinyl halides such as vinyl chloride, vinylidene chloride, and the like; N-vinyl compounds such as N-vinylpyrrolidone, N-vinylcaprolactam, N-vinylcarbazole, and the like; vinyl ketones such as methyl vinyl ketone and the like.

A preferred embodiment of the first polymer comprises:
1) from 75.00 to 99.99 parts by weight of polymerized monomer units derived from (meth)acrylic acid esters of non-tertiary alkyl alcohols containing 1–14 carbon atoms;
2) from 0.01 to 5.00 parts by weight of polymerized monomer units derived from an ethylenically-unsaturated monomer possessing polymerizable functional groups;
3) from 0 to 10 parts by weight of at least one polar monomer; (i.e. "polar monomers") and
4) from 0 to 10 parts by weight of other monomers (described below).

The composition of this invention may further comprise a second component of the composition that may be a second polymer having polymerizable functional groups, or may be a second polyfunctional compound having a plurality of co-reactive functional groups. The crosslinked composition of the invention results from the polymerization of the pendent functional groups of the first and second components, with the polymeric photoinitiator.

The first polymer component of the composition comprises (and the second polymer component if present) independently comprises one or more pendent groups that include free-radically polymerizable unsaturation. Preferred pendent unsaturated groups include (meth)acryloyl, (meth)acryloxy, propargyl, and (meth)acrylamido. Such pendent groups can be incorporated into the polymer in at least two ways. The most direct method is to include among the monomer units of ethylene di(meth)acrylate, 1,6-hexanediol diacrylate (HDDA), or bisphenol-A di(meth)acrylate. Useful polyunsaturated monomers include allyl, propargyl, and crotyl(meth)acrylates, trimethylolpropane triacrylate, pentaerythritol triacrylate, and allyl 2-acrylamido-2,2-dimethylacetate.

Using the "direct method" of incorporating the pendent, free-radically polymerizable functional group, useful functional monomers include those unsaturated aliphatic, cycloaliphatic, and aromatic compounds having up to about 36 carbon atoms that include a functional group capable of free radical addition such as those groups containing a carbon-carbon double bond including vinyl, vinyloxy, (meth)acrylic, (meth)acrylamido, and acetylenic functional groups.

Examples of polyethylenically unsaturated monomers that can be used include, but are not limited to, polyacrylic-functional monomers such as ethylene glycol diacrylate, propylene glycol dimethacrylate, trimethylolpropane triacrylate, 1,6-hexamethylenedioldiacrylate, pentaerythritol di-, tri-, and tetraacrylate, and 1,12-dodecanedioldiacrylate; olefinic-acrylic-functional monomers such as allyl methacrylate, 2-allyloxycarbonylamidoethyl methacrylate, and 2-allylaminoethyl acrylate; allyl 2-acrylamido-2,2-dimethylacetate; divinylbenzene; vinyloxy group-substituted functional monomers such as 2-(ethenyloxy)ethyl(meth)acrylate, 3-(ethynyloxy)-1-propene, 4-(ethynyloxy)-1-butene, and 4-(ethenyloxy)butyl-2-acrylamido-2,2-dimethylacetate, and the like. Useful polyunsaturated monomers, and useful reactive/co-reactive compounds that may be used to prepare a polymer having pendent unsaturation are described in greater detail in U.S. Pat. No. 5,741,543 (Winslow et al.), incorporated in its entirety herein by reference.

Preferred polyunsaturated monomers are those where the unsaturated groups are of unequal reactivity. Those skilled in the art recognize that the particular moieties attached to the unsaturated groups affect the relative reactivities of those unsaturated groups. For example, where a polyunsaturated monomer having unsaturated groups of equal reactivity (e.g., HDDA) is used, premature gellation of the composition must be guarded against by, for example, the presence of oxygen, which acts as a radical scavenger. Conversely, where a polyunsaturated monomer having unsaturated groups of differing reactivities is used, the more reactive group (such as (meth)acrylate as (meth)acrylamido) preferentially is incorporated into the polymer backbone before the less reactive unsaturated group (such as vinyl, allyl, vinyloxy, or acetylenic) reacts to crosslink the composition. The direct method is generally not preferred due to difficulty in control of branching and premature gellation.

An indirect, but preferred, method of incorporating pendent groups that comprise polymerizable unsaturation into the first polymer is to include among the monomer units of the polymer some that comprise a reactive functional group. Useful reactive functional groups include, but are not limited to, hydroxyl, amino (especially secondary amino), oxazolonyl, oxazolinyl, acetoacetyl, carboxyl, isocyanato, epoxy, aziridinyl, acyl halide, and cyclic anhydride groups. Preferred among these are carboxyl, hydroxyl and aziridinyl groups. These pendent reactive functional groups are reacted with unsaturated compounds that comprise functional groups that are co-reactive with the reactive pendent functional group. When the two functional groups react, a polymer with pendent unsaturation results.

Using the "indirect method" of incorporating the pendent, free-radically polymerizable functional groups, useful reactive functional groups include hydroxyl, secondary amino, oxazolinyl, oxazolonyl, acetyl, acetonyl, carboxyl, isocyanato, epoxy, aziridinyl, acyl halide, vinyloxy, and cyclic anhydride groups. Where the pendent reactive functional group is an isocyanato functional group, the co-reactive functional group preferably comprises a secondary amino or hydroxyl group. Where the pendent reactive functional group comprises a hydroxyl group, the co-reactive functional group preferably comprises a carboxyl, isocyanato, epoxy, anhydride, or oxazolinyl group. Where the pendent reactive functional group comprises a carboxyl group, the co-reactive functional group preferably comprises a hydroxyl, amino, epoxy, isocyanate, or oxazolinyl group. Most generally, the reaction is between a nucleophile and electrophic functional groups.

Representative examples of useful co-reactive compounds include hydroxyalkyl(meth)acrylates such as 2-hydroxyethyl(meth)acrylate and 2-(2-hydroxyethoxy)ethyl(meth)acrylate; aminoalkyl(meth)acrylates such as 3-aminopropyl(meth)acrylate and 4-aminostyrene; oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl(meth)acrylate; isocyanato-substituted compounds such as isocyanatoethyl(meth)acrylate and 4-isocyanatocyclohexyl(meth)acrylate; epoxy-substituted compounds such as glycidyl(meth)acrylate; aziridinyl-substituted compounds such as N-acryloylaziridine and 1-(2-propenyl)-aziridine; and acryloyl halides such as (meth)acryloyl chloride.

Preferred functional monomers have the general formula

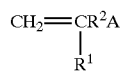

wherein $R^1$ is hydrogen, a $C_1$ to $C_4$ alkyl group, or a phenyl group, preferably hydrogen or a methyl group; $R^2$ is a single bond or a divalent linking group that joins an ethylenically unsaturated group to polymerizable or reactive functional group A and preferably contains up to 34, preferably up to 18, more preferably up to 10, carbon and, optionally, oxygen and nitrogen atoms and, when $R^2$ is not a single bond, is preferably selected from

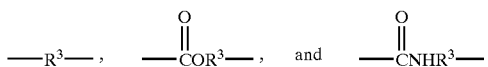

in which $R^3$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and A is a functional group, capable of free-radical addition to carbon-carbon double bonds, or a reactive functional group capable of reacting with a co-reactive functional group for the incorporation of a free-radically polymerizable functional group.

It will be understood in the context of the above description of the first and second polymers, that the ethylenically-unsaturated monomer possessing a free-radically polymerizable group is chosen such that it is free-radically polymerizable with itself (i.e. with another functional group on the same polymer) and with the pendent functional group of the second component (if present). The reactions between functional groups provide a crosslink by forming a covalent bond by free-radical addition reactions of ethylenically-unsaturated groups between polymeric compounds. In the present invention the pendent functional groups react by an addition reaction in which no by-product molecules are created, and the exemplified reaction partners react by this preferred mode.

Where the crosslinkable composition is to be processed using high temperatures and the direct method of including pendent unsaturation has been used, care must be taken not to activate those pendent groups and cause premature gelation. For example, hot-melt processing temperatures can be kept relatively low and polymerization inhibitors can be added to the mixture. Accordingly, where heat is to be used to process the composition, the above-described indirect method is the preferred way of incorporating the pendent unsaturated groups.

Polymers of the present invention have a degree of polymerization generally less than about 300. The greater than expected viscosity (for polymers having a degree of polymerization greater than 300), is attributed to entanglements of polymer chains. It has been shown empirically that polymers with less than 300 repeat units are not entangled. Prior to the present invention, unentangled polymers have been shown to be processible but they have low strength. The polymers having relatively low molecular weight, then build molecular weight (and strength) by chain-growth addition of the polymers, through the pendent polymerizable functional groups.

As result of the relatively low molecular weight, the polymers are easily processible in operations such as coating, spraying, extrusion and injection molding, because of the low melt viscosity prior to crosslinking. With the present polymers, the slope of the log-log plot of viscosity vs. molecular weight (Mn) is about 1, whereas for high molecular weight polymers the slope is 3.4. The polymers of the present invention provide processibility, then crosslinking of the polymers provides the needed physical properties such as toughness, hardness, impact resistance and others that are manifested in the cured state. Unless other indicated molecular weight will refer to number average molecular weight.

The molecular weight (average) of the polymer is less than 500,000, and more preferably less than 100,000. Above this molecular weight the viscosity of the polymer is such that coating is very difficult without the use of solvents, viscosity modifiers, plasticizers or by using a "syrup polymer" technique, by which the polymer is dissolved in the component monomers, which react into the polymer backbone, further increasing the molecular weight. Molecular weight may be controlled through the use of chain transfer agents, such as are known in the art.

Monomers that are useful and that comprise the major portion of the first (and second if present) polymers are predominantly alkyl(meth)acrylate esters. Alkyl(meth)acrylate ester monomers useful in the invention include straight-chain, cyclic, and branched-chain isomers of alkyl esters containing $C_1$–$C_{14}$ alkyl groups. Due to $T_g$ and sidechain crystallinity considerations, preferred alkyl(meth)acrylate esters are those having from $C_5$–$C_{12}$ alkyl groups, although use of $C_1$–$C_4$ and $C_{13}$–$C_{14}$ alkyl groups are also useful if the combinations provide a molecule averaged number of carbon atoms between $C_5$ and $C_{12}$. Useful specific examples of alkyl(meth)acrylate esters include: methyl acrylate, ethyl acrylate, n-propyl acrylate, 2-butyl acrylate, iso-amyl acrylate, n-hexyl acrylate, n-heptyl acrylate, isobornyl acrylate, n-octyl acrylate, iso-octyl acrylate, 2-ethylhexyl acrylate, iso-nonyl acrylate, decyl acrylate, undecyl acrylate, dodecyl acrylate, tridecyl acrylate, and tetradecyl acrylate. Most preferred (meth)acrylate esters include iso-octyl acrylate, 2-ethylhexyl acrylate, and isobornyl acrylate.

The first polymer (and second, if present) may comprise free-radically polymerizable monomer units derived from monomers having pendent fluorinated groups. Such "fluorinated monomers" are used in amounts sufficient to impart the desired degree of low surface energy and/or release properties to the resulting crosslinked composition, and are of the formula:

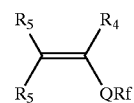

wherein $R_4$ is hydrogen, halogen, or straight chain or branched chain alkyl containing 1 to about 4 carbon atoms;

each $R_5$ is independently hydrogen or straight chain or branched chain alkyl containing 1 to about 4 carbon atoms;

each Q is a covalent bond or an organic linking group, such as a alkyleneoxycarbonyl group, or a sulfonamidoalkylene group;

$R_f$ is a fully or partially fluorinated fluoroaliphatic group, such as —$(CF_2)_3CF_3$.

A salient component of the fluorochemical monomers is the fluoroaliphatic group, designated herein as $R_f$. The fluorinated monomers contain from about 5 percent to about 80 percent, more preferably from about 20 percent to about 65 percent, and most preferably about 25 percent to about 55 percent fluorine by weight, based on the total weight of the compound, the loci of the fluorine being essentially in the $R_f$ groups. $R_f$ is a stable, inert, non-polar, preferably saturated, monovalent moiety which is both oleophobic and hydrophobic. $R_f$ preferably contains at least about 3 carbon atoms, more preferably 3 to about 20 carbon atoms, and most preferably about 4 to about 14 carbon atoms. $R_f$ can contain straight chain, branched chain, or cyclic fluorinated alkylene groups or combinations thereof or combinations thereof with straight chain, branched chain, or cyclic alkylene groups. $R_f$ is preferably free of polymerizable olefinic unsaturation and can optionally contain catenary heteroatoms such as divalent oxygen, or trivalent nitrogen.

It is preferred that $R_f$ contain about 35% to about 78% fluorine by weight, more preferably about 40% to about 78% fluorine by weight. The terminal portion of the $R_f$ group contains a fully fluorinated terminal group. This terminal group preferably contains at least 7 fluorine atoms, e.g., $CF_3CF_2CF_2—$, $(CF_3)_2CF—$, or the like. Perfluorinated aliphatic groups (i.e., those of the formula $C_xF_{2x+1}$, where x is 4 to 14 are the most preferred embodiments of $R_f$.

The fluoroaliphatic group $R_f$ is linked to the organic portion (i.e. the oligomeric backbone or the unsaturated portion of the monomer) by a linking group designated as Q in the formulas used herein. Q is a linking group that is a covalent bond, divalent alkylene, or a group that can result from the condensation reaction of a nucleophile such as an alcohol, an amine, or a thiol with an electrophile, such as an ester, acid halide, isocyanate, sulfonyl halide, sulfonyl ester, or may result from a displacement reaction between a nucleophile and leaving group. Each Q is independently chosen, preferably contains from 1 to about 20 carbon atoms and can optionally contain catenary oxygen, nitrogen, sulfur, or silicon-containing groups or a combination thereof. Q is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of suitable linking groups Q include straight chain, branched chain, or cyclic alkylene, arylene, aralkylene; oxy, oxo, hydroxy, thio, sulfonyl, sulfoxy, amino, imino, sulfonamido, carboxamido, carbonyloxy, urethanylene, ureylene, and combinations and multiples thereof such as sulfonamidoalkylene or polyoxyalkylene. Preferably linking group Q is a covalent bond, divalent alkylene or a sulfonamidoalkylene group.

Suitable linking groups Q include the following structures in addition to a covalent bond. For the purposes of this list, each k is independently an integer from 0 to about 20, $R_1'$ is hydrogen, phenyl, or alkyl of 1 to about 4 carbon atoms, and $R_2'$ is alkyl of 1 to about 20 carbon atoms. Each structure is non-directional, i.e. $—(CH_2)_kC(O)O—$ is equivalent to $—O(O)C(CH_2)_k—$.

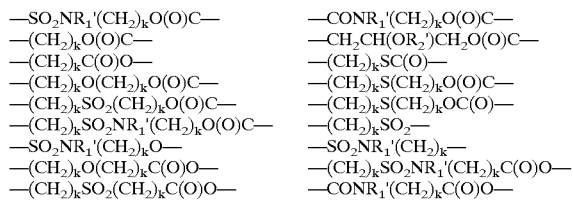

With reference to a formulation for a preferred embodiment of the first polymer, representative examples of free-radically polymerizable "polar monomers" having at least one ethylenically unsaturated polymerizable group which are copolymerizable with acrylate and functional monomers include strongly polar copolymerizable monomers including but not limited to those selected from the group consisting of substituted (meth)acrylamides, N-vinyl pyrrolidone, N-vinyl caprolactam, acrylonitrile, tetrahydrofurfuryl acrylate, acrylamides, and mixtures thereof, and the like.

Again, in reference to the formulation for a preferred embodiment of the first polymer, where the desired product is a psa, the selection of the "other monomers" useful in preparing the composition is done in such a manner that the ultimate crosslinked pressure sensitive adhesive has sufficient conformability, tack, and adhesion to form a bond to a substrate at room temperature. One measure of a psa's ability to conform to a substrate sufficiently at room temperature and to form an adhesive bond is the material's glass transition temperature ($T_g$). A useful, guiding principal is that a psa interpolymer should have a $T_g$ of $-15°$ C. (258° K) or lower in order for effective adhesive application at room temperature. A useful predictor of interpolymer $T_g$ for specific combinations of various monomers can be computed by application of Fox Equation (1) (obtained from W. R. Sorenson and T. W. Campbell's text entitled "Preparative Methods of Polymer Chemistry", Interscience: New York (1968), p. 209). Specific values for $T_g$'s of appropriate homopolymers can be obtained from P. Peyser's chapter in "Polymer Handbook", 3rd edition, edited by J. Brandrup and E. H. Immergut, Wiley: New York (1989), pp. VI-209 through VI-277.

Again, in reference to the formulation for a preferred embodiment of the first polymer, useful "other monomers" include vinyl monomers such as vinyl acetate, styrenes, and alkyl vinyl ethers; and alkyl methacrylates. Useful "other monomers" may also include various polyunsaturated monomers, including addition products or copolymers or polymers comprising two different functional monomers (as defined previously) such that the product/copolymer/polymer exhibits the functionality of both of the constituent starting materials/monomers.

The first component may comprise a polyfunctional compound having a plurality of pendent, free-radically polymerizable functional groups (instead of a first polymer). Useful polyfunctional compounds have an average functionality (average number of functional groups per molecule) of greater than one, preferably greater than two and most preferably greater than 3. The functional groups are chosen to be copolymerizable with the pendent functional groups on the first polymer, and are selected to be free-radically polymerizable. Useful functional groups include those described for the first polymer and include, but are not limited to vinyl, vinyloxy, acrylic and acetylenic functional groups.

Dendritic polymers are preferred polyfunctional compounds and include any of the known dendritic architectures including dendrimers, regular dendrons, dendrigrafts, and hyperbranched polymers. Dendritic polymers are polymers with densely branched structures having a large number of reactive end groups. A dendritic polymer includes several layers or generations of repeating units which all contain one or more branch points. Dendritic polymers, including dendrimers and hyperbranched polymers, can be prepared by condensation, addition or ionic reactions of monomeric units having at least two different types of reactive end groups.

Useful polyfunctional compounds have the general formula

where Z is a functional group such as a carbon-carbon double bond, n is greater than 1 and R is an organic radical having a valency of n. Preferably R is an alkyl radical of valency n which may be linear or branched.

The preparation and characterization of dendrimers, dendrons, dendrigrafts, and hyperbranched polymers, is well known. Examples of dendrimers and dendrons, and methods of synthesizing the same are set forth in U.S. Pat. Nos. 4,507,466; 4,558,120; 4,568,737; 4,587,329; 4,631,337; 4,694,064; 4,713,975; 4,737,550; 4,871,779 and 4,857,599, the disclosures of which are incorporated herein by reference. Examples of hyperbranched polymers and methods of preparing the same are set forth, for example, in U.S. Pat. No. 5,418,301.

More generally, dendritic polymers or macromolecules are characterized by a relatively high degree of branching (DB), which is defined as the number average fraction of branching groups per molecule, i.e., the ratio of terminal groups plus branch groups to the total number of terminal groups, branch groups and linear groups. For dendrimers, the degree of branching is one. For linear polymers the degree of branching approaches zero. Hyperbranched polymers have a degree of branching that is between that of linear polymers and ideal dendrimers. The dendritic polymers used in this invention preferably have a degree of branching which is at least equal to 0.1, more preferably greater than 0.4, and most preferably greater than 0.5.

The polymeric photoinitiator may be the same polymer or a different polymer than the first component polymer (or may be a mixture of the two) having a plurality of pendent polymerizable functional groups. In other words, the first polymer may further comprise monomer units derived from the ethylenically unsaturated monomers having a photoinitiator group. In such cases the first polymer may comprise:

1) from 0.01 to 99.99 parts by weight of polymerized units of free radically polymerizable ethylenically-unsaturated monomers;

2) from 99.99 to 0.01 parts by weight of a polymerized monomer units derived from an ethylenically-unsaturated monomer possessing polymerizable functional groups, and 3) 0.1 to 5 parts by weight of ethylenically unsaturated monomers having a pendent photoinitiator group.

In a preferred embodiment, said first polymer may comprise:

1) from 75.00 to 99.99 parts by weight of polymerized monomer units derived from (meth)acrylic acid esters of non-tertiary alkyl alcohols containing 1–14 carbon atoms;

2) from 0.01 to 5.00 parts by weight of polymerized monomer units derived from an ethylenically-unsaturated monomer possessing polymerizable functional groups;

3) from 0 to 10 parts by weight of polymerized monomer units derived from a polar monomer;

4) from 0 to 10 parts by weight of polymerized monomer units derived from other monomers (as previously described) and 5) from 0.1 to 5 parts by weight of ethylenically unsaturated monomers having a photoinitiator group.

In another preferred embodiment, the polymeric photoinitiator may be a separate polymer that comprises:

1) from 0.01 to 99.99 parts by weight of polymerized units of free radically polymerizable ethylenically-unsaturated monomers; and 2) from 99.99 to 0.01 parts by weight of a polymerized monomer units derived from an ethylenically-unsaturated monomer having a pendent photoinitiator group.

It will be understood with respect to the above formula, that the polymeric photoinitiator may have a photoinitiator group on essentially each repeat unit of the polymer (i.e. >90% of the repeat units).

In a preferred embodiment the separate polymeric photoinitiator comprises (1) from 75.00 to 99.99 parts by weight of polymerized monomer units derived from (meth)acrylic acid esters of non-tertiary alkyl alcohols containing 1–14 carbon atoms;

(2) from 0 to 10 parts by weight of polymerized monomer units derived from a polar monomer; (i.e. "polar monomers");

(3) from 0 to 10 parts by weight of polymerized monomer units derived from other monomers (as previously described) and (4) from 0.01 to 5 parts by weight of polymerized monomer units derived from ethylenically unsaturated monomers having a photoinitiator group.

Ethylenically unsaturated monomers that comprise a radiation-sensitive group, preferably an α-cleaving photoinitiator group and that are copolymerizable with the aforementioned free radically-polymerizable ethylenically unsaturated monomers (hereinafter "photoinitiator monomers") constitute from 0.0001 to about 5 pbw, preferably 0.01 to 3 pbw, of the crosslinkable composition. Preferred photoinitiator monomers include free-radically polymerizable, ethylenically unsaturated compounds having the functionality represented by the structure:

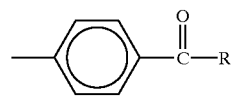

wherein R is

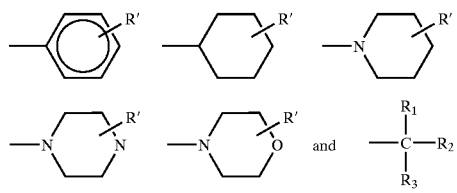

wherein R' is H or a C1 to C4 alkyl group, $R_1$, $R_2$, and $R_3$ are independently a hydroxyl group, a phenyl group, a $C_1$ to $C_6$ alkyl group, or a $C_1$ to $C_6$ alkoxy group.

A variety of photoinitiator monomers can be made by reacting an ethylenically unsaturated monomer comprising a first reactive functional group with a compound that comprises a radiation-sensitive group and second reactive functional group, the two functional groups being co-reactive with each other. Preferred co-reactive compounds are ethylenically unsaturated aliphatic, cycloaliphatic, and aromatic compounds having up to 36 carbon atoms, optionally one or more oxygen and/or nitrogen atoms, and at least one reactive functional group. When the first and second functional groups react, they form a covalent bond and link the co-reactive compounds.

Examples of useful reactive functional groups include hydroxyl, secondary amino, oxazolinyl, oxazolonyl, acetyl, acetonyl, carboxyl, isocyanato, epoxy, aziridinyl, acyl halide, and cyclic anhydride groups. Where the pendent reactive functional group is an isocyanato functional group, the co-reactive functional group preferably comprises a secondary amino, carboxyl, or hydroxyl group. Where pendent reactive functional group comprises a hydroxyl group, the co-reactive functional group preferably comprises a carboxyl, isocyanato, epoxy, anhydride, or oxazolinyl group. Where the pendent reactive functional group comprises a carboxyl group, the co-reactive functional group preferably comprises a hydroxyl, amino, epoxy, vinyloxy, or oxazolinyl group.

Representative examples of useful co-reactive compounds include hydroxyalkyl(meth)acrylates such as 2-hydroxyethyl(meth)acrylate and 2-(2-hydroxyethoxy)ethyl(meth)acrylate; aminoalkyl(meth)acrylates such as 3-aminopropyl(meth)acrylate and 4-aminostyrene; oxazolinyl compounds such as 2-ethenyl-1,3-oxazolin-5-one and 2-propenyl4,4-dimethyl-1,3-oxazolin-5-one; carboxy-substituted compounds such as (meth)acrylic acid and 4-carboxybenzyl(meth)acrylate; isocyanato-substituted compounds such as isocyanatoethyl(meth)acrylate and 4-isocyanatocyclohexyl(meth)acrylate; epoxy-substituted compounds such as glycidyl(meth)acrylate; aziridinyl-substituted compounds such as N-acryloylaziridine and 1-(2-propenyl)-aziridine; and acryloyl halides such as (meth)acryloyl chloride.

Representative examples of co-reactive compounds include functional group-substituted compounds such as 1-(4-hydroxyphenyl)-2,2-dimethoxyethanone, 1-[4-(2-hydroxyethyl)phenyl]-2,2-dimethoxyethanone, (4-isocyanatophenyl)-2,2-dimethoxy-2-phenylethanone, 1-{4-[2-(2,3-epoxypropoxy)phenyl]}-2,2-dimethyl-2-hydroxyethanone, 1-[4-(2-aminoethoxy)phenyl]-2,2-dimethoxyethanone, and 1-[4-(carbomethoxy)phenyl]-2,2-dimethoxyethanone. Such photoinitiator monomers (and polymeric photoinitiators derived therefrom) are described, for example, in U.S. Pat. No. 5,902,836 (Babu et al.) and U.S. Pat. No. 5,506,279 (Babu et al.), the disclosures of which are herein incorporated by reference.

As previously described, the composition of the present invention comprises a first component with a plurality of pendent polymerizable functional groups (which may be a first polymer or a polyfunctional compound), an optional second component with a plurality of pendent polymerizable functional groups (which may also be either a second polymer or a polyfunctional compound), and a polymeric initiator, which may be a separate polymer or may be the first polymer. The physical form of the composition may be a viscous liquid or low melting solid or a powder, which is related to the glass transition temperature and the molecular weight. The glass transition temperature and molecular weight of the polymer component(s) may be adjusted to obtain compositions having desired properties useful for a myriad of applications ranging from hot-melt adhesives to protective films. Liquid polymers may be obtained if the glass transition temperature of the polymer component (or the melting point of the polyfunctional compound) is below ambient temperature and the molecular weight of the polymer component is below entanglement molecular weight (i.e. a degree of polymerization of less than about 300). Low melting solids may be obtained when the Tg is at or below ambient temperature. Powders may be obtained when the Tg is above ambient temperature.

The first polymer can be prepared (e.g., by solution polymerization followed by isolation) and then added to a separately prepared second polymer (if present) and polymeric initiator. Any residual monomer and/or solvents used in the preparation are generally removed by conventional techniques such as distillation, vacuum evaporation, etc. The order of addition of the individual components of the composition is not important since the polymerizable functional groups do not react prior to initiation by the polymeric initiator. Thus the useful shelf life or "open time" is maximized, i.e. the time during which the composition is applied to a substrate (such as a tape backing) and remains sufficiently tacky to effect a bond between the first substrate and a second substrate. Once the open time has been exceeded, a second substrate cannot be readily bonded to the first substrate. Long open times are generally preferred. Shelf life refers to the amount of time the composition may be stored without premature gellation.

The composition may be coated onto backings at useful and relatively time-stable thicknesses ranging from 25–500 micrometers or more. Coating can be accomplished by any conventional means such as roller, dip, knife, or extrusion coating. Stable thicknesses are necessary to maintain the desired coating thickness prior to crosslinking of the composition to form the crosslinked composition.

A preferred method of preparing a pressure sensitive adhesive article comprises partially crosslinking the novel composition to a useful coating viscosity, coating the partially crosslinked composition onto a substrate (such as a tape backing) and further crosslinking the composition. Partial reaction provides a coatable composition in instances where the melt strength of the first polymer (and second component, if present) is too low. Useful coating viscosities are generally in the range of 500 to 10,000 cps.

Polymerization can be accomplished by exposing the composition to energy in the presence of a polymeric photoinitiator. These photoinitiators can be employed in concentrations ranging from about 0.0001 to about 5.0 pbw, preferably from about 0.001 to about 3.0 pbw, and more preferably from about 0.005 to about 0.5 pbw, per 100 pbw of the composition.

Once configured into the desired construction, the composition including the first component, optional second component and the polymeric photoinitiator may be irradiated with activating UV radiation to crosslink the composition. UV light sources can be of two types: 1) relatively low light intensity sources such as blacklights which provide generally 10 mW/cm$^2$ or less (as measured in accordance with procedures approved by the United States National Institute of Standards and Technology as, for example, with a UVIMAP™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially crosslink the polymer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$.

Accordingly, relatively thick coatings (e.g., at least about 0.025 mm) can be achieved when the extinction coefficient of the photoinitiator is low. Coatings from of 0.5 or more mm thick are possible and are within the scope of the present invention. Additional advantages of the photopolymerization method are that 1) heating the composition is unnecessary and 2) photoinitiation is stopped completely when the activating light source is turned off.

If so desired, measuring the refractive index of the composition material especially in bulk can be used to monitor the extent of polymerization. The refractive index changes linearly with respect to conversion. This monitoring method is commonly applied in polymerization kinetics work. See discussions about the method in, for example, G. P. Gladyshev and K. M. Gibov, *Polymerization at Advanced Degrees of Conversion*, Keter Press, Jerusalem (1970).

When preparing a crosslinked composition of the invention, it is expedient for the photoinitiated polymerization reactions to proceed to virtual completion, i.e., depletion of the pendent polymerizable functional groups, at temperatures less than about 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the polymer and formation of the crosslinked pressure sensitive adhesives of the invention. Free radical polymerization inhibitors are often required at processing temperatures of 70° C. and higher for reaction periods of more than about 6 hours.

The crosslinked composition is characterized as a polymer having a first polymer chain having the residue of at least one pendent, ethylenically unsaturated moiety chemically bonded to the residue of at least one photoinitiator moiety that is pendent from a second polymer chain. Preferably each polymer chain comprises an acrylate polymer chain. Thus, during exposure to UV energy, the free radical resulting from the photoinitiator adds to the pendent ethylenically unsaturated moiety to form a crosslink between the polymer chains upon coupling or propagation with another polymerizable group on another polymer chains. When the composition further comprises a second component polymer or polyfunctional compound, the crosslinked composition is characterized as a polymer having a first polymer chain having the residue of at least one pendent, ethylenically unsaturated moiety chemically bonded to the residue of at least one photoinitiator moiety that is pendent from a second polymer chain and/or the ethylenically unsaturated moiety pendent from the second component polymer or polyfunctional compound. In general, the present crosslinked composition has effective molecular weight between crosslinks, ($M_c$), of greater than or equal to 1,000 and preferably greater than 3,000. Effective molecular weight between crosslinks (Mc), may be measured by dynamic mechanical analysis.

The degree of crosslinking may be easily controlled by the number and concentration of pendent unsaturated groups and by the number and concentration of photoinitiator groups that are pendent from polymer chains. The ratio of photoinitiator groups to pendent, free-radically polymerizable, unsaturated groups can vary from about 1:10,000 to 1:1, depending on the degree of crosslinking desired. Generally the smaller the $M_c$, the lower the elasticity and hence harder the film. On the other hand, non-crosslinked films exhibit greater flexibility.

In addition to the ingredients mentioned above, the polymer composition may include certain other materials such as pigments, tackifiers, foaming agents and reinforcing agents. However, the addition of any such material adds complexity and hence expense to an otherwise simple, straightforward, economical composition and process and is not preferred except to achieve specific results.

EXAMPLES

Test Methods

The test procedures used in the examples to evaluate and compare the properties of adhesive compositions are industry standard tests. These tests are described in detail in various publications of the American Society for Testing Materials (ASTM), Philadelphia, Pa. and the Pressure Sensitive Tape Council (PSTC), Glenview Ill. References to these standards are also given.

Shear Strength (ASTM D-3654-78; PSTC-7)

The adhesive films as described in the examples were cut into strips 1.27 cm in width and adhered by its adhesive to a flat, rigid stainless steel plate with exactly 2.54 cm length of tape in contact with the plate. Before testing, a 1000 g weight at 25° C. was placed over the bonded area for 15 minutes. Then, the plate with the adhered tape was placed either at room temperature (23° C.) or in an air-circulating oven that had been preheated to 70° C. After equilibrating for 15 minutes, a 500 g or 1000 g weight was hung from the free end of the tape, with the panel tilted 2° from the vertical to insure against any peeling forces. The time (in minutes) at which the weight fell was the "Shear Strength (min)" at 23° C. (1000 g) or 70° C. (500 g). The test was discontinued at 10,000 minutes if there was no failure. In the Tables, this was designated as 10,000+ minutes Mode of Failure (MOF)

The mode of failure of some shear tests is indicated as follows:
 PP=pop-off, i.e., 75–100% adhesive failure from steel plate;
 C=Cohesive failure, both surfaces completely covered by adhesive;
 r=residue failure: adhesive covering 100% of backing with a small residue transferred to panel;
 SM=smear: adhesive covering 100% of backing with a substantial amount (less than 100%) transferred to panel;
 FB=failure from backing: 75–100% adhesive failure from the backing; all adhesive adheres to panel.

The pop-off failure mode is preferred because it is indicative of adhesive failure of the adhesive/steel interfacial bond as opposed to cohesive failure of the adhesive. Adhesives of various shear adhesions, all within the range of the present invention (1–10,000 minutes), are preferred depending on end-use applications.

Two specimens of each tape were tested and the shear tests were averaged to obtain the shear value.

Peel Adhesion [ASTM D 3330-78; PSTC-1 (11/75)]

Peel adhesion is the force required to remove an adhesive-coated test specimen from a test panel measured at a specific angle and rate of removal. In the examples, this force is expressed in Newtons per decimeter (N/dm) width of coated sheet. The procedure followed is:
 (1) A test specimen 12.7 mm wide is applied to a horizontally positioned clean glass test plate. A 2.2 kg rubber roller is used to press a 12.7 cm length of specimen into firm contact with the glass surface.
 (2) The free end of the specimen is doubled back nearly touching itself so the angle of removal is 180°. The free end is attached to the adhesion tester scale.

(3) The glass test plate is clamped in the jaws of tensile testing machine which is capable of moving the plate away from the scale at a constant rate of 2.3 meters per minute.

(4) The scale reading in Newtons is recorded as the tape is peeled from the glass surface.

Molecular Weight (Number Average)

Molecular weight of the polymers was measured using Gel Permeation Chromatography. Samples were prepared by the addition of 10 ml of tetrahydrofuran (THF) to approximately 25.mg of sample. The solution was filtered using a 0.2 micron PTFE syringe filter. 150 microliters of solution was injected into a six column set (Jordi Associates mixed bed and 500 A columns, Jordi Associates Inc., Bellingham, Mass.) in combination with a Waters 2690™ Separation Module (Waters Corp., Milford, Mass.). The 2690 operated at room temperature, using THF as the eluent, flowing at a rate of 1.0 ml/min. Changes in concentration were detected by a HP 1047 A refractive index detector (Hewlett Packard Instruments, Palo Alto, Calif.). The molecular weight calculations were based upon a calibration made of narrow dispersity polystyrenes ranging in molecular weight from 6.30E6 to 266. The actual calculations were completed with Caliber™ software (Polymer Laboratories, Inc., Amherst, Mass.).

Probe Tack

A probe tack test was used to evaluate the tackiness of the materials as described by ASTM D2979–88. The material to be tested was placed on the test probe area of a TMI Polyken™ Probetack™ (Model 80-02-01), commercially available from Testing Machines Inc., Amityville, N.Y. with an pressure of 100 g/cm². The probe head speed was 1 cm/sec, time of contact was 1 sec, and probe withdrawal speed was 1 cm/sec. The test was initiated with at least ten determinations take at random points. The average peak value was recorded in grams.

Percent Gel Test [ASTM D 3616-82]

The percent gel is used as an indication of cure level. Adhesives containing tackifying resins are corrected to the actual percent gel. The corrected percent gel is 100 times the gelled mass divided by the total mass of material that is capable of forming a gelled network. Soluble materials such as tackifiers are subtracted out when determining the gel fraction.

Crosslinking by radiation improves the creep and shear resistance of adhesives. The transition from a cohesive to an adhesive failure during peeling advances to a lower peel rate and higher temperature with increasing crosslinking density.

Many important properties of crosslinked adhesives vary with the gel content. Hence, determination of the gel content provides a means for controlling the process and thereby raising the quality of the adhesive.

Extraction tests permit verification of the proper gel content of adhesives and they also permit comparison between different crosslinked adhesives and their specific end uses.

Gel Content Determination

A square test specimen (3.81 cm×3.81 cm) containing approximately 0.06 g of adhesive is cut from the tape and placed in a 120-mesh stainless steel basket measuring approximately 4 cm³. The contents are weighed to the nearest 0.1 mg and then immersed in a capped beaker containing sufficient toluene to cover the specimen. After extraction for 24 to 48 hours, the basket (containing the specimen) is removed, drained, and placed in an oven at 93° C. The basket and specimen are dried to a constant weight and the gel content is determined as follows:

Extract %=Weight lost during extraction/Weight of original specimen×100

For the tackified adhesives, the weight of the resin was subtracted before calculating the corrected gel content as follows:

Extract %=Weight lost during extraction/Weight of final specimen−Weight of resin×100

Corrected gel content=100—Extract %

Two specimens of each tape were tested and the results were averaged to obtain the gel content value.

Unless otherwise specified, all chemicals and reagents were obtained from Aldrich Chemical Co., Milwaukee, Wis.

Example 1

In a glass polymerization bottle were charged 90 g isooctyl acrylate (IOA), 10 g acrylic acid (AA), 4 g of 2-[4-(2-hydroxy-2-methylpropanoyl)phenoxy]ethyl-2-methyl-2-N-propenoylamino propanoate ("VAZPIA," prepared according to Example 1 of U.S. Pat. No. 5,506,279, incorporated herein by reference), 100 g ethyl acetate, 0.5 g dibenzoyl peroxide, and carbon tetrabromide in varying amounts to prepare polymers of varying molecular weights, as noted below. The bottle was purged with nitrogen, sealed, and tumbled in a water bath maintained at 60° C. for 12 hrs. Polymer samples of three number average molecular weights ($M_N$) were prepared.

| Sample | Carbon Tetrabromide, g | Polymer $M_N$ |
|---|---|---|
| 1a | 0.5 | 85,000 |
| 1b | 1.0 | 52,000 |
| 1c | 1.5 | 32,000 |

Example 2

In a glass polymerization bottle were charged 85 g IOA, 10 g AA, 5 g hydroxyethyl methacrylate (HEMA), log ethyl acetate, 0.5 g dibenzoyl peroxide, and carbon tetrabromide in varying amounts to prepare polymers of varying molecular weights, as noted below. The bottle was purged with nitrogen, sealed, and tumbled in a water bath maintained at 60° C. for 12 hrs. Polymer samples of three number average molecular weights ($M_N$) were prepared.

| Sample | Carbon Tetrabromide, g | Polymer $M_N$ |
|---|---|---|
| 2a | 0.5 | 92,000 |
| 2b | 1.0 | 57,000 |
| 2c | 1.5 | 36,000 |

The terpolymer solutions were treated with either vinyldimethyl azlactone (VDM) and a catalytic amount of 1,8-diazabicyclo{4.3.0}undec-7-ene (DBU) or isocyanatoethyl methacrylate (IEM) in amounts equimolar to the amount of HEMA in the terpolymer to afford terpolymers with pendent ethylenic unsaturation, designated as "2aVDM," "2aIEM," etc.

Example 3

1:1 (by weight) mixtures of polymer solutions from Example 1 and from Example 2 were coated onto 40 μm poly(ethylene terephthalate) film (PET) at a dried thickness of 40 μm, and subjected to UV irradiation under a nitrogen blanket at an irradiated dose of 100 or 200 mJ/cm², as shown in Table 1. Adhesive properties of the resulting crosslinked polymers are shown in Table 1.

TABLE 1

ADHESIVE PROPERTIES OF REACTIVE LOW MOLECULAR WEIGHT POLAR POLYMERS

| Sample | Comp. | Dose mJ/cm² | Mc gm/mol | Gel Content (%) | Peel Adhesion N/dm | Shear Strength (min) 23° C. | Shear Strength (min) 70° C. |
|---|---|---|---|---|---|---|---|
| 3-1(C) | 1a + 2aVDM | — | — | — | 38 | 68 | 4 |
| 3-2(C) | 1a + 2aIEM | — | — | — | 36 | 29 | 1 |
| 3-3 | 1a + 2aVDM | 100 | 34000 | 87 | 32 | 10K+ | 10K+ |
| 3-4 | 1a + 2aIEM | 100 | — | 82 | 34 | 10K+ | 3168 |
| 3-5(C) | 1a + 2bVDM | — | — | — | 42 | 20 | — |
| 3-6(C) | 1a + 2bIEM | — | — | — | 46 | 13 | — |
| 3-7 | 1a + 2bVDM | 100 | 18000 | 88 | 43 | 10K+ | 10K+ |
| 3-8 | 1a + 2bIEM | 100 | — | — | 41 | 10K+ | 1250 |
| 3-9(C) | 1a + 2cVDM | — | — | — | 48 | 1 | — |
| 3-10(C) | 1a + 2cIEM | — | — | — | 45 | 20 | — |
| 3-11 | 1a + 2cVDM | 100 | 9000 | 92 | 38 | 10K+ | 10K+ |
| 3-12 | 1a + 2cIEM | 100 | — | 93 | 39 | 10K+ | 230 pp |
| 3-13 | 1b + 2aVDM | 100 | 25000 | 92 | 36 | 10K+ | 10K+ |
| 3-14 | 1b + 2bVDM | 200 | — | 93 | 31 | 10K+ | 10K+ |
| 3-15 | 1b + 2cVDM | 200 | — | 94 | 32 | 10K+ | 10K+ |
| 3-16 | 1c + 2bVDM | 200 | 8000 | 91 | 30 | 112 pp | 104 pp |
| 3-17* | 1c + 2cVDM | 100 | — | 92 | 22 | 38 pp | 22 pp |
| 3-18 | 1c + 2cVDM | 100 | — | 87 | 26 | 30 pp | 35 pp |

*hot-melt coated at 90° C. using mini hot-melt coater

In Table 1, "$M_c$" refers to molecular weight, between crosslinks.

The data of Table 1 allow several conclusions. First, crosslinking reactions of reactive polymers of the invention provided adhesives having good peel adhesion and shear strength. Second, adhesives with good properties (peel>32 N/dm and shear>10K min) were obtained with both VDM- and IEM-pendent ethylenic unsaturation. Third, $M_c$ should be greater than about 8000 in order to provide good adhesive properties (compare, e.g., Sample 3-16 v. 3-11). Fourth, pop-off failure of some samples (e.g., 3-16 to 3-18) suggests high crosslinking density of the adhesives.

Example 4

In a glass polymerization bottle were charged 90 g IOA, 10 g AA, 0.5 g 2-mercaptoethanol, 100 g ethyl acetate and 0.2 g azobis(isobutyronitrile)(AIBN). The bottle was purged with nitrogen, sealed, and tumbled in a water bath maintained at 60° C. for 14 hrs. to produce an —SCH₂CH₂OH terminated IOA/AA macromer of $M_N$=22,000. The macromer was reacted with 0.92 g VDM and 4 drops of DBU to afford the corresponding acrylamido-functional macromer. Various percentages of the macromer were mixed with selected compositions of Example 3, coated onto PET liner, dried and subjected to UV irradiation to effect crosslinking, as described in Example 3. Properties of the resulting polymers are shown in Table 2.

TABLE 2

| Sample | Comp'n | Macromer phr | Dose mJ/cm² | Gel (%) | Peel N/dm | Shear (min) 70° C. |
|---|---|---|---|---|---|---|
| 4-1-1 | 3-17 | — | 100 | 92 | 22 | 22 pp |
| 4-1-2 | " | 5 | 100 | 88 | 31 | 108 pp |
| 4-1-3 | " | 15 | 100 | 68 | 36 | 1112 pp |
| 4-2-1 | 3-16 | — | 200 | 91 | 30 | 104 pp |
| 4-2-2 | " | 15 | 200 | 76 | 34 | 2240 pp |
| 4-2-3 | " | 30 | 200 | 64 | 38 | 6879 pp |
| 4-2-4 | " | 40 | 200 | 68 | 36 | 221 c |
| 4-3-1 | 3-3 | 10 | 100 | 82 | 34 | 10K+ |
| 4-4-1 | 3-15 | 10 | 100 | 78 | 39 | 10K+ |

The data of Table 2 show that addition of a low-$M_N$ macromer dilutes the crosslink density of the crosslinked reactive polymers of the invention. In the case of Samples 4-1-1 through 4-1-4, the initially high crosslink density of Sample 3-17, the polymerization product of two low-$M_N$ polymers, was successively decreased such that high-temperature peel strength increased with increasing macromer content, while shear strength reached a maximum near 15% macromer (Sample 4-1-3). Similar results were seen in the case of Samples 4-2-1 through 4-2-4, wherein high-temperature shear strength increased significantly with increased crosslink dilution, and reached a maximum at 30% macromer content (Sample 4-2-3).

Example 5

In a glass polymerization bottle were charged 90 g IOA, 10 g AA, 0.4 g VAZPIA, 100 g ethyl acetate, and 0.5 g dibenzoyl peroxide. The bottle was purged with nitrogen, sealed, and tumbled in a water bath maintained at 60° C. for 14 hrs. to produce an IOA/AA/VAZPIA terpolymer having an $M_N$=450,000, designated as Sample 5A. This high molecular weight polymer having a pendent photoinitiator moiety was mixed with the low molecular weight polymer mixture of Sample 3-17, coated onto a PET liner, and subjected to UV irradiation to effect crosslinking, as described in Example 3. Properties of the resulting polymer are shown in Table 3.

Example 6

In a glass polymerization bottle were charged 85 g IOA, 10 g AA, 5 g HEMA, 100 g ethyl acetate, and 0.5 g dibenzoyl peroxide. The bottle was purged with nitrogen, sealed, and tumbled in a water bath maintained at 60° C. for 14 hrs. to produce an IOA/AA/HEMA terpolymer having an $M_N$=380,000. The polymer was further treated with sufficient VDM, in the presence of DBU catalyst, to convert approximately 20% of the pendent hydroxyl groups into acrylamido-functional groups. The resulting ethylenically-unsaturated polymer was designated as Sample 6A.

Example 7

In a glass polymerization bottle were charged 84.6 g IOA, 10 g AA, 5 g HEMA, 0.4 g VAZPIA, 100 g ethyl acetate, and 0.5 g dibenzoyl peroxide. The bottle was purged with nitrogen, sealed, and tumbled in a water bath maintained at 60C. for 14 hrs. to produce an IOA/AA/HEMA/VAZPIA tetrapolymer having an $M_N$=344,000. The polymer was further treated with sufficient VDM, in the presence of DBU catalyst, to convert approximately 20% of the pendent hydroxyl groups into acrylamido-functional groups. The resulting ethylenically-unsaturated polymer, additionally bearing pendent photoinitiator groups, was designated as Sample 7A.

Example 8

Varying concentrations of the high molecular weight polymers of Examples 5, 6, and 7 were mixed with the low molecular weight polymer mixture of Sample 3-17 (comprising an IOA/AA/VAZPIA terpolymer having an $M_N$=32,000 and an IOA/AA/HEMA(VDM) terpolymer having and $M_N$=36,000) in 100 g ethyl acetate, coated on a PET liner, dried and subjected to a dose of 100 mJ/cm$^2$ of UV light to effect crosslinking. In the absence of the high molecular weight diluent, the polymer resulting from crosslinking Sample 3-17 showed poor shear strength and peel adhesion (also shown in Table 3). Properties of the resulting polymers are shown in Table 3.

TABLE 3

| Sample Number | Additive phr | Gel Content (%) | Peel Adhesion N/dm | Shear Strength (min) 70° C. |
|---|---|---|---|---|
| 5A | | | | |
| 8-1 | 0 | 92 | 22 | 22 pp |
| 8-2 | 2 | 88 | 28 | 108 pp |
| 8-3 | 6 | 85 | 29 | 2250 pp |
| 8-4 | 10 | 82 | 31 | 6208 pp |
| 8-5 | 15 | 72 | 34 | 9808 |
| 6A | | | | |
| 8-6 | 2 | 93 | 28 | 35 pp |
| 8-7 | 5 | 90 | 31 | 220 pp |
| 8-8 | 10 | 86 | 31 | 3106 pp |
| 8-9 | 15 | 82 | 32 | 6809 pp |
| 7A | | | | |
| 8-10 | 10 | 88 | 36 | 5690 pp |

The data of Table 3 show that dilution of crosslink density by a co-reactive, high molecular weight diluent significantly increases the peel adhesion and high temperature shear strength of crosslinked, low molecular weight reactive polymers. Dilution with a photoactive polymer followed by crosslinking (Samples 8-2 through 8-5) produced stronger crosslinked polymers than did dilution with an ethylenically-unsaturated polymer followed by crosslinking (Samples 8-6 through 8-9).

Example 9

A reactive polymer comprising pendent ethylenically-unsaturated groups was prepared by mixing 97.5 g of an 80:20 (w/w) mixture of IOA:isobornyl acrylate (IBA), 2.5 g HEA, 0.8 g isooctyl thioglycolate (IOTG) chain transfer agent and 0.5 g dibenzoyl peroxide in 100 g of ethyl acetate in a glass polymerization bottle. The bottle was purged with nitrogen and sealed, then tumbled in a water bath for 14 hours at 60° C. On cooling, the contents were mixed with 3 g VDM and a catalytic amount of DBU. Futher heating and shaking produced an ethylenically-unsaturated polymer having and $M_N$ of 22,000.

Example 10

A reactive polymer comprising pendent ethylenically-unsaturated groups was prepared by mixing 97.5 g of an 80:20 (w/w) mixture of IOA:isobornyl acrylate (IBA), 2.5 g HEA, 0.8 g IOTG and 0.5 g dibenzoyl peroxide in 100 g of ethyl acetate in a glass polymerization bottle. The bottle was purged with nitrogen and sealed, then tumbled in a water bath for 14 hours at 60° C. On cooling, the contents were mixed with 1.2 g VDM and a catalytic amount of DBU. Futher heating and shaking produced an ethylenically-unsaturated polymer having and $M_N$ of 23,000.

Example 11

A reactive polymer comprising pendent photoinitiator groups was prepared by mixing 98 g of an 80:20 (w/w) mixture of IOA:IBA, 2 g of 4-(2-acryloyloxyethoxy)phenyl (2-hydroxy-2-propyl)ketone (ZLI-3331™, Ciba-Geigy, Basel, Switzerland, referred to below as "PIA") and 2 g of triethylsilane (TES) chain transfer agent. The bottle was purged with nitrogen and sealed, then tumbled in a water bath for 14 hours at 60° C. On cooling, a polymeric photoinitiator having an $M_N$ of 23,000 was obtained.

Example 12

A reactive polymer comprising pendent photoinitiator groups was prepared by mixing 99.2 g of an 80:20 (w/w) mixture of IOA:IBA, 0.8 g of PIA and 1 g of triethylsilane (TES) chain transfer agent. The bottle was purged with nitrogen and sealed, then tumbled in a water bath for 14 hours at 60° C. On cooling, a polymeric photoinitiator having an $M_N$ of 23,000 was obtained.

Example 13

Mixtures of the ethylenically-unsaturated polymer from Example 9 and the polymeric photoinitiator from Example 11 were prepared in varying concentrations of each polymer in 100 g ethyl acetate, coated on a PET liner and dried, then subjected to UV irradiation at varying dosages. Adhesive properties of the resulting crosslinked polymers are shown in Table 5. The data of Table 5 show that reactive polymers having a relatively high ethylenic unsaturation content (Example 9) produce high crosslink density when reacted with polymeric photoinitiators (Example 11), and the resulting crosslinked polymers exhibit high shear values (typically greater than 10,000 minutes) but do not exhibit high peel values. Table 5 also shows that crosslinked polymers exhibiting a wide range of properties can be obtained by choosing an appropriate ratio of reactive polymers as well as an appropriate irradiation dosage.

Example 14

Mixtures of the ethylenically-unsaturated polymer from Example 10 and the polymeric photoinitiator from Example 12 were prepared in varying concentrations of each polymer in 100 g ethyl acetate, coated on a PET release liner, dried, then subjected to UV irradiation at varying dosages. Adhesive properties of the resulting crosslinked polymers are shown in Table 6. The data of Table 6 show that crosslinked polymers having low crosslink density (due to the low ethylenic unsaturation of the polymer of Example 9) exhibit higher peel values while also exhibiting lower shear values

Example 15

A series of 1:1 mixtures of the reactive polymers of Examples 9–11 were prepared, both with and without a tackifier (Regalrez™ 6108, Hercules Inc., Wilmington, Del.) commonly used in pressure sensitive adhesive formulations. Adhesive compositions obtained by UV irradiating the mixtures at varying dosages were subjected to peel, shear, and probe tack evaluation, and the properties are shown in Table 7.

TABLE 5

| | | | | | | | | |
|---|---|---|---|---|---|---|---|---|
| Example 9 | | 100* | 80 | 60 | 50 | 40 | 20 | |
| Example 11 | | | 20 | 40 | 50 | 60 | 80 | 100 |
| | Dose mJ/cm² | | | | | | | |
| Peel, N/dm | 100 | | | | 4.22 | | | 9.98c |
| | 200 | | | | 4.66 | | | 13.93c |
| | 300 | 11.98 | 5.40 | 3.89 | 5.97 | 3.98 | 11.08 | 23.72 |
| | 600 | | | | 4.39 | | | 16.70 |
| | 900 | 3.51 | 3.15 | 3.11 | 4.08 | 4.70 | 7.68 | 12.10 |
| Shear, min 23° C. | 300 | 344 pp | 1060 pp | 10,000+ | 10,000+ | 10,000+ | 10,000+ | 2c |
| | 900 | 10,000+ | 10,000+ | 10,000+ | 10,000+ | 10,000+ | 10,000+ | 10,000+ |

*irradiated in the presence of 0.2 phr Irgacure 184 ™ photoinitiator (Ciba-Geigy Chemical Co., Danbury, CT)

TABLE 6

| | | | | | | | | |
|---|---|---|---|---|---|---|---|---|
| Example 10 | | 100* | 80 | 60 | 50 | 40 | 20 | |
| Example 12 | | | 20 | 40 | 50 | 60 | 80 | 100 |
| | Dose mJ/cm² | | | | | | | |
| Peel, N/dm | 100 | | | | 19.89 | | | 31.60c |
| | 200 | | | | 24.19 | | | 42.93c |
| | 300 | 27.18 | 25.73 | 25.99 | 28.55 | 24.40 | 34.99 | 51.96c |
| | 600 | | | | 18.79 | | | 26.69 |
| | 900 | 16.23 | 18.10 | 18.12 | 20.07 | 20.24 | 30.12 | 33.77 |
| Shear, min 23° C. | 300 | 249 pp | 167 pp | 610 pp | 719 pp | 494 pp | 1006 pp | 13 c |
| | 900 | 779 pp | 844 pp | 1119 pp | 3231 pp | 987 pp | 1248 pp | 355 pp |

*irradiated in the presence of 0.2 phr Irgacure 184 ™ photoinitiator (Ciba-Geigy Chemical Co., Danbury, CT)

TABLE 7

| | | | | | | |
|---|---|---|---|---|---|---|
| Example 9 | | | | | 50 | 50 | 50 |
| Example 10 | 50 | 50 | 50 | | | |
| Example | | | | 50 | 50 | 50 |

TABLE 7-continued

| | | 11 | | | | | |
|---|---|---|---|---|---|---|---|
| Example 12 | | | | | 50 | 50 | 50 |
| Regalrez ™ 6108 | | 15 | 30 | | 15 | 30 | |
| | Dose mJ/cm² | | | | | | |
| Peel, N/dm | 100 | 14.59 | | 72.55 | 15.76 | 39.29 | 62.52fb |
| | 200 | 13.87 | | | 18.32 | | |
| | 300 | 11.84 | 32.82 | 64.66 | 13.09 | 39.52 | 61.9fb |
| | 600 | 9.16 | | | 11.73 | | |
| | 900 | 10.07 | 34.85 | 58.50 | 6.53 | 33.89 | 57.17r |
| Shear 23° C. | 100 | | | 5644 c | | 470 c | 2730 c |
| | 300 | 10,000+ | 2730 c | 8914 c | 433 pp | 593 c | 3197 c |
| | 900 | 10,000+ | 6456 c | 10,000+c | 10,000+ | 1353 c | 4796 c |
| Probe Tack, g | 100 | 903 | | 1371 | 800 | 1116 | 779 |
| | 300 | 631 | | 855 | 580 | 1113 | 720 |
| | 900 | 557 | 737 | 819 | 479 | 822 | 654 |

Example 16

In a glass polymerization bottle were charged 80 g IOA, 20 g IBA, 1 g PIA, 100 g ethyl acetate, 0.5 g dibenzoyl peroxide, and carbon tetrabromide in varying amounts to prepare polymers of varying molecular weights, as noted below. The bottle was purged with nitrogen, sealed, and tumbled in a water bath maintained at 60° C. for 12 hrs. Polymer samples of three number average molecular weights ($M_N$) were prepared.

| Sample | Carbon Tetrabromide, g | Polymer $M_N$ |
|---|---|---|
| 16a | 0.2 | 96,000 |
| 16b | 0.5 | 59,000 |
| 16c | 0.8 | 38,000 |

Example 17

In a glass polymerization bottle were charged 85 g IOA, 10 g AA, 5 g HEMA, 100 g ethyl acetate, 0.5 g dibenzoyl peroxide, and carbon tetrabromide in varying amounts to prepare polymers of varying molecular weights, as noted below. The bottle was purged with nitrogen, sealed, and tumbled in a water bath maintained at 60° C. for 12 hrs. Polymer samples of three number average molecular weights ($M_N$) were prepared.

| Sample | Carbon Tetrabromide, g | Polymer $M_N$ |
|---|---|---|
| 17a | 0.2 | 104,000 |
| 17b | 0.5 | 68,000 |
| 17c | 0.8 | 22,000 |

The terpolymer solutions were treated with isocyanatoethyl methacrylate (IEM) in amounts equimolar to the amount of HEMA in the terpolymer to afford terpolymers with pendent ethylenic unsaturation, referred to as Sample 17A.

Example 18

1:1 (by weight) mixtures of polymer solutions from Example 16 and from Example 17 were coated onto 40 μm poly(ethylene terephthalate) film (PET) at a dried thickness of 40 μm, and subjected to UV irradiation at an intensity of about 2.2 mW/cm² for a time sufficient to receive an irradiated dose of 100 or 200 mJ/cm², as shown in Table 8. Adhesive properties of the resulting crosslinked polymers are shown in Table 8.

TABLE 8

| Sample | Composition | Dose mJ/cm² | Peel Adhesion N/dm | Shear Strength (min) 23° C. |
|---|---|---|---|---|
| 18-1 | 16a + 17a | 100 | 48 | 9800 |
| 18-2 | 16a + 17b | 100 | 52 | 3808 |
| 18-3 | 16a + 17c | 100 | 58 | 2402 |
| 18-4 | 16b + 17a | 200 | 46 | 3400 |
| 18-5 | 16b + 17b | 200 | 51 | 1108 |
| 18-6 | 16b + 17c | 200 | 56 | 2207 |
| 18-7 | 16c + 17a | 200 | 39 | 4605 |
| 18-8 | 16c + 17b | 200 | 42 | 2800 |
| 18-9 | 16c + 17c | 200 | 47 | 1297 |

The data of Table 8 show that appropriate choice of molecular weight reactive polymers can produce crosslinked adhesive polymers having tailored high-to-low shear and/or peel properties.

Example 19

A reactive polymer having pendent photoinitiator groups was prepared by charging a glass polymerization bottle with 90 g IOA, 10 g AA and 0.1 g PIA, 100 g ethyl acetate, and 0.5 g dibenzoyl peroxide. The bottle was purged with nitrogen, sealed, and tumbled in a water bath maintained at 60° C. for 14 hrs. to produce an IOA/AA/PIA terpolymer.

Example 20

A copolymer having an $M_N$ of 49,000 comprising 90 parts IOA and 10 parts AA was prepared essentially as described in Example 2, except that no HEMA was present in the reaction mixture.

The copolymer was further reacted, prior to isolation from the ethyl acetate solvent, with 2 wt. % (based on total polymer weight) glycidyl methacrylate, to prepare a polymer having pendent ethylenically-unsaturated groups, wherein the oxirane ring of glycidyl methacrylate reacted with some of the pendent carboxylic acid groups of the polymer chain. The polymer was designated Sample 23A.

Similarly, the polymer was reacted with aziridinyl acrylate to obtain a second polymer having pendent ethylenically-unsaturated groups, designated as Sample 23B.

Example 21

Crosslinked polymers were prepared from mixtures of solutions of the polymeric photoinitiator of Example 19 with the ethylenically-unsaturated polymers of Example 20 by UV irradiation of mixtures thereof that had been previously coated onto a release-coated polyester backing, then dried to obtain coatings of a thickness of approximately 40 μm. Adhesive properties of the crosslinked polymers are shown in Table 9.

TABLE 9

| Sample | Composition | Peel adhesion N/dm | Shear Strength (min) |
|---|---|---|---|
| | Ex. 19:20a | | |
| 21-1 | 20:80 | 37 | 1150 pp |
| 21-2 | 40:60 | 36 | 2609 |
| 21-3 | 60:40 | 42 | 4400 |
| 21-4 | 80:20 | 42 | 4309 |
| | Ex. 19:20b | | |
| 21-5 | 20:80 | 24 | 8760 |
| 21-6 | 40:60 | 31 | 1699 |
| 21-7 | 60:40 | 31 | 1490 |
| 21-8 | 80:20 | 42 | 6709 |

The data of Table 9 show that adhesives having balanced shear and peel properties can be obtained by appropriate combinations of photoinitiator polymer and ethylenically-unsaturated polymer.

Example 22

A reactive terpolymeric photoinitiator was prepared essentially as described in Example 11, wherein a terpolymer comprising 90 IOA/19 IBA/1 PIA (parts by weight) having an $M_N$ of 56,000 was obtained. 0.8 g triethylsilane (TES) was used as the chain transfer agent.

Example 23

A terpolymer comprising 80 IOA/18 IBA/2 AA (parts by weight) was prepared in 100 g ethyl acetate, with 0.5 g dibenzoyl peroxide initiator and 0.8 g triethylsilane CTA. $M_N$ of the polymer was 59,000.

In a manner similar to Example 20, carboxylic acid groups of the polymer were reacted with 2 wt % glycidyl methacrylate to obtain a reactive polymer having pendent ethylenic unsaturation, designated as Sample 23A.

Similarly, the terpolymer was reacted with aziridinyl acrylate to obtain a reactive polymer having ethylenic unsaturation, designated as Sample 23B.

Example 24

Crosslinked polymers were prepared from mixtures of the polymeric photoinitiator of Example 22 with the ethylenically-unsaturated polymers of Example 23 by UV irradiation of mixtures thereof that had been previously coated onto a release-coated polyester backing, then dried to obtain coatings of a thickness of approximately 40 μm. Adhesive properties of the crosslinked polymers are shown in Table 10.

TABLE 10

| Sample | Composition | Peel adhesion N/dm | | Shear Strength (min) |
|---|---|---|---|---|
| | | Glass | Polyprop | |
| | Ex.22:23A | | | |
| 24-1 | 20:80 | 46 | 48 | 160 |
| 24-2 | 40:60 | 53 | 42 | 209 |
| 24-3 | 60:40 | 42 | 38 | 498 |
| 24-4 | 80:20 | 38 | 30 | 225 |
| | Ex. 22:23B | | | |
| 24-5 | 20:80 | 46 | 34 | 660 |
| 24-6 | 40:60 | 51 | 43 | 2169 |
| 24-7 | 60:40 | 45 | 36 | 1708 |
| 24-8 | 80:20 | 38 | 23 | 1308 |

The data of Table 10 show that, compared to the adhesives shown in Table 9, adhesives prepared from non-polar monomers (Table 10) have better peel adhesion properties than those prepared from polar monomers (Table 9).

Example 25

Reactive polymers containing perfluorobutyl chains were prepared and crosslinked.

Thus, a solution of 70 g N-methyl perfluorobutylsulfonamidoethyl acrylate (MeFBSEA, $CH_2=CHCOOCH_2CHNMeSO_2C_4F_9$, described in Japanese Kokai Publication 57/193580, p. 5), 30 g dimethylaminoethyl acrylate (DMAEA), 0.5 g VAZPIA, 0.5 g dibenzoyl peroxide, and 0.5 g IOTG chain transfer agent in 100 g ethyl acetate was tumbled in a polymerization bottle in a 60° C. water bath for 14 hours. On removal of solvent, a polymeric photoinitiator having an MN of 18,000 was obtained.

Example 26

In a manner similar to that described in Example 25, a terpolymer was prepared from 70 g MeFBSEA, 30 g DMAEA, and 4 g HEMA. While still in solution, a stoichiometric amount of VDM was added along with a catalytic amount of DBU and the mixture was further agitated and heated. On removal of solvent, a reactive polymer comprising pendent ethylenic unsaturation was obtained, having an $M_N$ of 22,000.

Example 27

A mixture of 300 g N-methyl perfluorobutylsulfonamidoethyl alcohol (MeFBSE-OH, C4F9SO2N(CH3)CH2CH2OH, prepared in two stages by reacting perfluorobutylsulfonamidofluoride with methylamine and ethylenechlorohydrin, using a procedure essentially as described in Example 1 of U.S. Pat. No. 2,803,656 (Ahlbrecht, et al.) and 480 g-caprolactone was heated to 160 C. under nitrogen. Dibutyltin dilaurate (600 mg) was added, and the mixture was stirred at 160 C. for 6 h. After cooling to room temperature, the desired perfluorinated caprolactone alcohol was obtained as a tan solid having a hydroxyl equivalent weight of 755. A mixture of 50 g of the alcohol, 9.2 g vinyl dimethylazlactone, and 0.1 g DBU was heated to 65 C. for 24 h. After cooling to room temperature, a waxy solid corresponding to the desired N-methyl perfluorobutylsulfonamidoethyl caprolactone acrylamide (MeFBS(cap)Ac) was obtained.

In a manner similar to that described in Example 25, a terpolymer was prepared from 70 g MeFBS(cap)Ac, 30 g DMAEA and 0.5 g VAZPIA. The resulting polymeric photoinitiator had a $M_N$ of 26,000.

Example 28

In a manner similar to that described in Example 26, a terpolymer was prepared from 70 g MeFBS(cap)A, 30 g DMAEA, and 4 g HEMA. While still in solution, a stoichiometric amount of VDM was added along with a catalytic amount of DBU and the mixture was further agitated and heated. On removal of solvent, a reactive polymer comprising pendent ethylenic unsaturation was obtained, having an $M_n$ of 26,000.

Example 29

Crosslinked compositions containing the perfluorobutyl groups as described in Examples 25–28 were prepared by mixing equal-weight portions of reactive polymers, coating the mixtures onto a poly(ethylenterephthalate) film at approximately 40 microns thickness and UV-irradiating the films at 100 mJ/cm2. Water and hexane repellency for the crosslinked polymers as well as for the reactive polymers was measured using a Model 322 Dynamic Contact Angle Analyzer (Cahn Instruments, Madison, Wis.). Sample plates required for contact angle measurements using the Wilhelmy technique (L. Wilhelmy, Ann. Physik, 119 (1863) 177) were prepared by bonding two 24 mm wide strips of the adhesive together (back to back) so that only the adhesive surface was presented to the test liquid. Advancing and receding contact angles were measured at 3–5 different regions of the surface of the Wilhelmy plate. Results are shown in Table 11.

TABLE 11

| Sample | Composition | Water AC | Water RC | Hexane AC | Hexane RC |
|---|---|---|---|---|---|
| 29-1 | Ex. 25 | 98 | 74 | 67 | 54 |
| 29-2 | Ex. 26 | 96 | 73 | 69 | 51 |
| 29-3 | Exs 25 + 26 | 102 | 96 | 82 | 69 |
| 29-4 | Ex. 27 | 94 | 48 | 62 | 42 |
| 29-5 | Ex. 28 | 92 | 46 | 59 | 44 |
| 29-6 | Exs. 27 + 28 | 98 | 65 | 76 | 52 |

AC = advancing contact angle, °
RC = receding contact angle, °

The data of Table 11 show that crosslinked polymers comprising perfluorobutyl groups can be easily prepared and the polymers exhibit improved advancing and receding contact angles for water droplets over their non-crosslinked constituent reactive polymers. Slight improvement in contact angles for hexane were also observed.

Example 30

Crosslinked polymers comprising pendent acrylamide groups were prepared and evaluated as clear coats.

Thus, a solution of n-butylacrylate(nBA), n-butylmethacrylate(nBMA), styrene(St), methyl methacrylate(MMA), and 2-hydroxyethyl methacrylate (HEMA) was prepared at 50% solids in 100 g xylenes, then mixed with approximately 5 wt % peroxide initiator (ethyl 3,3-di(t-amylperoxy)butyrate). The reaction mixture was heated at 135–140° C. for 10 hr. On cooling, the mixture was treated with a molar proportion of VDM to attach acrylamide groups at the sites of pendent hydroxyl groups. Reactive polymers prepared are described in Table 12. The weight of each monomer is reported in grams. PD means polydispersity.

TABLE 12

| Sample | nBA | nBMA | St | MMA | HEMA | $M_N$ | PD |
|---|---|---|---|---|---|---|---|
| 30-1 | 15 | 15 | 30 | 35 | 5 | 3200 | 3.4 |
| 30-2 | 15 | 25 | 30 | 30 | 10 | 3400 | 3.2 |
| 30-3 | 10 | 15 | 30 | 30 | 15 | 2800 | 3.8 |

Example 31

In a manner similar to that described in Example 30, copolymers were prepared in which the HEMA monomer was replaced by PIA monomer, to prepare polymeric photoinitiators. In Table 13, the weight of each monomer is reported in grams.

TABLE 13

| Sample | nBA | nBMA | St | MMA | PIA | $M_N$ | PD |
|---|---|---|---|---|---|---|---|
| 31-1 | 15 | 15 | 30 | 35 | 5 | 2400 | 4.2 |
| 31-2 | 15 | 15 | 30 | 38 | 3 | 2800 | 3.8 |

Example 32

Crosslinked copolymers were prepared from mixtures of the reactive polymers of Examples 30 and 31. Equal-weight mixtures of each component were prepared, mixed thoroughly, and coated on stainless steel coupons at a thickness shown in Table 14, then UV-irradiated at 800 mJ/cm$^2$. The resulting crosslinked polymer was subjected to evaluation for resistance to methyl ethyl ketone (MEK), as described in ASTM D5402-93. Results of the evaluation are shown in Table 14.

TABLE 14

| Sample | Composition | Thickness, $\mu$m | MEK rubs |
|---|---|---|---|
| 32-1 | 30-1 + 31-1 | 15 | 25 |
| 32-2 | 30-2 + 31-1 | 14 | 42 |
| 32-3 | 30-3 + 31-2 | 17 | 120 |

The data of Table 14 show that crosslinked polymers having higher crosslink density (Sample 32-3) can be prepared and are more resistant to MEK than those having lower crosslink density.

Example 33

Crosslinked polymers were prepared from the compositions described in Example 32, except that the polymers were prepared from powder formulations. Thus, an MEK solution of each of the three pairs of reactive polymers was prepared. The reactive polymers were precipitated from methanol, collected, and dried under vacuum. The solid mixture was ground in a manual grinder to obtain a fine powder that was electrostatically sprayed onto a poly (ethyleneterephthalate) backing film. The coated film was heated at 140° C. for 5 minutes, then irradiated with UV lamps (800 mJ/cm$^2$) to crosslink the polymer composition. Each of the three polymers thus obtained passed a HB Pencil Hardness test (ASTM D3360-00). The polymer having highest crosslink density, corresponding to the formulation of Sample 32-3, also passed the MEK 120 Double Rubs test (ASTM D5402-93).

Example 34

Reactive polymers were prepared by sequential addition of monomers bearing pendent reactive groups.

A glass polymerization bottle was charged with 95 g of an 80:20 (w/w) mixture of IOA:IBA, 3 g HEMA, 100 g ethyl acetate, 0.5 g dibenzoyl peroxide, and 1.5 g isooctylthioglycolate. The bottle was purged with nitrogen, sealed, and tumbled in a water bath maintained at 60° C. until the polymerization was complete to about 50–60% conversion. The bottle was charged with an additional 2 g of PIA, again purged with nitrogen, sealed, and tumbled in a water bath at 60° C. until polymerization was complete. The number average molecular weight of the polymer was 29,000.

The polymer solution was reacted with an eqimolar portion of vinyldimethyl azlactone (VDM) with respect to HEMA in the presence of 5 mole % of 1,8-diazabicyclo{4.3.0}undec-7-ene(DBU) (based on VDM) to afford a polymer containing photoinitiator groups and free-radically polymerizable ethylenically-unsaturated groups. The mixture was coated onto 50 μm thick poly(ethylene terephthalate) and dried to give a 37 μm coating thickness. The coating was subjected to high intensity UV radiation for a time sufficient to receive a dose of 200 mJ/cm$^2$. The peel adhesion and shear strength of the resulting adhesive were 34 N/dm and 10,000+ minutes at ambient temperature, respectively.

This method allows the synthesis of low molecular weight, low viscosity polymers having pendent complimentary co-reactive groups. The polymer mixture can be characterized as a compatible mixture of polymers comprising some polymer chains with pendent unsaturation only, some polymer chains containing both pendent unsaturation and photoinitiator units and some polymer chains containing photoinitiator units only. The concentration of each reactive group in the polymer depends on the reactivity of the respective monomers and the rate of addition of each monomer at different stages of the polymerization.

Example 35

Reactive polymers in which every repeating unit includes a (co)reactive group have been prepared.

(a) Synthesis of poly(VDM) Via ionic Polymerization

A glass polymerization bottle was charged with 130 g VDM, 193.5 g ethyl acetate, and 5.3 g trifluoroacetic acid. The bottle was purged with nitrogen, sealed, and tumbled in a water bath maintained at 60° C. The number average molecular weight of poly(VDM) was 1000.

(b) Synthesis of poly(VDM) Via Precipitation Polymerization

A glass polymerization bottle was charged with 10 g VDM, 100 g cyclohexane and 0.2 g thermal free-radical initiator 2,2'-azobis(2,4-dimethylvaleronitrile) VAZO™ 52, DuPont Chemicals, Wilmington, Del.). The bottle was purged with nitrogen, sealed, and tumbled in a water bath maintained at 60° C. for 2 hrs. The solution was clear during early stages of polymerization. As the polymerization proceeded the polymer was precipitated as a clean white precipitate. The number average molecular weight of poly (VDM) was approximately 18,000.

(c) Synthesis of poly(VDM) Via Precipitation Polymerization

A solution of 10 g VDM, 20 g decane, and 0.2 g t-butyl peroxydibenzoate was slowly added to a reaction flask containing 40 g decane preheated to 125° C. Poly(VDM) precipitated with time as a slightly brown precipitate. The number average molecular weight of VDM was approximately 9000.

Modification of Poly(VDM)

Poly(VDM) of 1000 $M_N$ (Example 35a) was reacted with a molar proportion of 2-hydroxy-1-[4-(2-hydroxyethoxy) phenyl]-2-methyl-1-propanone (Irgacure™ 2959, Ciba-Geigy, Chicago, Ill.) in the presence of DBU to afford a low molecular weight polymer containing pendent photoinitiator units, referred to as VDM-PIA.

Modification of Poly(VDM)

Poly(VDM) of 1000 $M_N$ (Example 35a) was reacted with a molar proportion of 2-hydroxyethyl methacrylate in the presence of DBU to afford a low molecular weight polymer containing pendent unsaturated units, referred to as VDM-ACR.

Example 36

Reactive polymers from Examples 22 and 23B were mixed in equal proportions (w/w) along with 0.2% by weight of a fluorinated surfactant (FC-431 ™, 3M, St. Paul, Minn.). The polymer mixture was frothed with nitrogen at 23° C. for 5 minutes, then knife coated onto a 50 μm biaxially-oriented poly(ethylene terephthalate) (PET) film at a thickness of 125 mm. The coated froth was passed through a low intensity UV chamber maintained under nitrogen. The froth was exposed to radiation from black lamps having a peak output at 350 nm and an intensity of 4.0 mW/cm$^2$. The adhesive had a peel adhesion of 65 N/dm and shear strength of 10,000+ minutes at 23° C.

Example 37

Reactive polymers from Examples 22 and 23B were mixed in equal proportions (w/w) along with 2 weight percent of expandable polymeric microspheres having a shell composition containing acrylonitrile and methacrylonitrile (Expancel™ 091, Akzo Nobel Chemicals, Inc., Stratford, Conn.). The mixture was coated onto a 50 μm biaxially-oriented poly(ethylene terephthalate) (PET) film at a thickness of 125 μm. The coated film was passed through a low intensity UV chamber maintained under nitrogen. The film was heated at 120° C. for 2 minutes to expand the microspheres. The foamed film was exposed to radiation from lamps having a peak output at 350 nm and an intensity of 4.0 mW/cm$^2$. The adhesive had a peel adhesion of 54 N/dm and shear strength of 10,000+ minutes at 23° C.

Example 38

Reactive polymers from Examples 22 and 23B were mixed in equal proportions (w/w) along with 0.2 phr of a chemical blowing agent, 4,4'-oxybis (benzenesulfonylhydrazide) (Celogen™ TO, Uniroyal Chemical Co., Middlebury, Conn.). The polymer mixture was coated onto a 50 μm biaxially-oriented poly(ethylene terephthalate) (PET) film at a thickness of 125 μm. The coated film was passed through a UV chamber maintained under nitrogen. The film was exposed to radiation from lamps having a peak output at 350 nm and an intensity of 4.0 mW/cm$^2$. The film was heated at 120° C. for 5 minutes to obtain the foamed adhesive. The adhesive had a peel adhesion of 42 N/dm and shear strength of 10,000+ minutes at 23° C.

Example 39

A removable pressure sensitive adhesive was prepared according to the method of the invention.

A glass polymerization bottle was charged with 50 g IOA, 48 g octadecyl acrylate, 2 g HEMA, 100 g ethyl acetate, 0.5 g dibenzoyl peroxide, and 1.5 g isooctylthioglycolate. The bottle was purged with nitrogen, sealed, and tumbled in a water bath maintained at 60° C. until the polymerization was complete to about 50–60% conversion. The bottle was additionally charged with 2 g PIA, then purged with nitrogen, sealed, and tumbled in a water bath at 60° C. until polymerization was complete. The number average molecular weight of the polymer was 22,000.

The polymer solution was reacted with a molar proportion of vinyldimethyl azlactone (VDM) with respect to HEMA in the presence of 5 mole % of 1,8-diazabicyclo{4.3.0}undec-7-ene (DBU) (based on VDM) to afford a polymer containing photoinitiator groups and free-radically polymerizable ethylenically-unsaturated groups. The mixture was coated onto 20-pound bond paper (Georgia-Pacific Corp., Brunswick, Ga.) and oven-dried to a coating thickness of about 25 µm. The coating was exposed to UV radiation to a dose of 200 mJ/cm$^2$. Peel adhesions were measured on office paper after about 72 hr and 1 week dwell time. The values were 28 and 31 N/dm, respectively. Repeated applications to the paper did not result in paper tearing.

Example 40

A low-adhesion backsize composition was prepared according to the method of the invention.

A glass polymerization bottle was charged with 51 g octadecyl acrylate 25 g acrylonitrile, 13 g methyl acrylate, 11 g acrylic acid, 100 g ethyl acetate, 0.5 g dibenzoyl peroxide, and 1.5 g isooctylthioglycolate. The bottle was purged with nitrogen, sealed, and tumbled in a water bath maintained at 60° C. until the polymerization was complete to about 50–60% conversion. The bottle was additionally charged with 2 g PIA, then purged with nitrogen, sealed, and tumbled in a water bath at 60° C. until polymerization was complete. The number average molecular weight of the polymer was 25,000.

The polymer solution was reacted with a molar proportion of vinyldimethyl azlactone (VDM) with respect to HEMA in the presence of 5 mole % of 1,8-diazabicyclo{4.3.0}undec-7ene (DBU) (based on VDM) to afford polymer containing photoinitiator groups and free-radically polymerizable ethylenically-unsaturated groups. The polymer composition (5% solids) was coated onto PET backing with a glass rod, then dried at 60° C. for 5 minutes. The coating was exposed to UV radiation to a dose of 200 mJ/cm$^2$. Masking tape and acrylic tape (3M Magic™ tape, 3M, St. Paul, Minn.) were applied on the coated polyester backing. The tapes were aged for 72 hours at 23° C. and at 70° C. and examined for peel values before and after aging.

| | Peel, N/dm | |
| --- | --- | --- |
| Adhesive | 23° C. | 70° C. |
| Acrylic IOA/AA(93/7) (Magic ™ tape) | 14 | 18 |
| Masking tape | 24 | 32 |

The results shown in the Table indicate that a low-adhesion backsize having acceptably-low peel (i.e., good release) properties can be obtained using the method of the invention, and that the low peel values are maintained after heat aging.

What is claimed is:

1. A crosslinkable composition comprising:
   a) a first component dendritic polymer having a plurality of pendent, free-radically polymerizable functional groups;
   b) a polymeric photoinitiator, and
   c) a residual content of less than 2%
   wherein said composition is melt processable at temperatures of less than or equal to 100° C.

2. The composition of claim 1 wherein said dendritic polymer is a dendrimer, regular dendron, dendrigraft, or hyperbranched polymer.

3. The composition of claim 1 wherein said dendritic polymer has degree of branching which is at least equal to 0.1

4. The composition of claim 1 wherein said dendritic polymer has degree of branching which is greater than 0.4.

5. The composition of claim 1 wherein said dendritic polymer has degree of branching which is greater than 0.5.

6. The composition of claim 1 having a viscosity of 500–10,000 centipoise at 22° C.

7. The composition of claim 1 further comprising a second component polymer having a plurality of pendent polymerizable functional groups.

8. The composition of claim 7 wherein said second component polymer comprises a polymer of at least 500 $M_n$ comprising:
   1) from 0.01 to 99.99 parts by weight of polymerized units of free radically polymerizable ethylenically-unsaturated monomers, and
   2) from 99.99 to 0.01 parts by weight of a polymerized monomer units derived from an ethylenically-unsaturated monomer possessing polymerizable functional groups.

9. The composition of claim 8 wherein said free radically polymerizable ethylenically-unsaturated monomers, are selected from vinyl aromatic monomers; α, β-unsaturated carboxylic acids and their derivatives; vinyl esters of carboxylic acids; vinyl halides; N-vinyl compounds and vinyl ketones.

10. The composition of claim 8 wherein said free radically polymerizable ethylenically-unsaturated monomers are selected from styrene, α-methylstyrene, 2- and 4-vinyl pyridine, acrylic acid, methacrylic acid, itaconic acid, maleic acid, fumaric acid, crotonic acid, methyl methacrylate, butyl methacrylate, 2-ethylhexyl methacrylate, ethyl acrylate, butyl acrylate, iso-octyl acrylate, octadecyl acrylate, cyclohexyl acrylate, tetrahydrofurfuryl methacrylate, phenyl acrylate, phenethyl acrylate, benzyl methacrylate, β-cyanoethyl acrylate, maleic anhydride, diethyl itaconate, acrylamide, methacrylonitrile, N-butylacrylamide, vinyl acetate, vinyl 2-ethylhexanoate, vinyl chloride, vinylidene chloride, N-vinylpyrrolidone, N-vinylcarbazole, and methyl vinyl ketone.

11. The composition of claim 8 wherein said second component polymer comprises
   a) from 75.00 to 99.99 parts by weight of polymerized monomer units derived from acrylic acid esters of non-tertiary alkyl alcohols containing 1–14 carbon atoms;
   b) from 0.01 to 5.00 parts by weight of a polymer derived from polymerized units of an ethylenically-unsaturated monomer possessing a polymerizable functional group co-reactive with said reactive groups of said first polymer;
   c) from 0 to 15 parts by weight of at least one monomer selected from the group consisting of acrylic acid, methacrylic acid, acrylamide, methacrylamide, acrylonitrile, methacrylonitrile, and N-vinylpyrrolidinone; and d) from 0 to 10 parts by weight of at least one monomer selected from the group consisting of vinyl monomers and alkyl methacrylates.

12. The composition of claim 1 wherein said first component dendritic polymer having pendent unsaturated polymerizable groups is prepared by the reaction of a polymer having a plurality of pendent reactive functional groups with an unsaturated compounds having co-reactive functional groups.

13. The composition of claim 12 wherein said pendent reactive functional groups are selected from hydroxyl, secondary amino, oxazolinyl, oxazolonyl, acetyl acetonyl, carboxyl, isocyanato, epoxy, aziridinyl, acyloyl halide, and cyclic anhydride groups.

14. The composition of claim 1 wherein said polymeric photoinitiator is prepared by the reaction of a polymer having a plurality of pendent reactive functional groups with an co-reactive compounds having photoinitator group.

15. The composition of claim 1 wherein essentially each repeat unit of the polymeric photoinitiator has a pendent photoinitiator group.

16. The composition of claim 1 further comprising an additive selected from pigments, tackifiers, foaming agents and reinforcing agents.

17. The composition of claim 1 which, when cured, exhibits a shrinkage of less than 2%.

18. The composition of claim 1 wherein the ratio of photoinitiator groups to pendent, free-radically polymerizable, unsaturated groups is from 1:10,000 to 1:1.

19. A crosslinked composition comprising the composition of claim 1.

20. The crosslinked composition of claim 19 having an average molecular weight between crosslinks, $M_c$, of $\geq 1,000$.

21. The crosslinked composition of claim 19 wherein $M_c$, is greater than about 8000.

22. The crosslinked composition of claim 19, wherein said composition is a coating, an adhesive, a sealant; blown microfibers; a high refractive index optical material; a barrier film; a low adhesion backsize, or a release coating.

23. A process for making a substrate bearing a coating of a crosslinked composition on at least one surface thereof, comprising the steps of:

a) coating onto said substrate the composition of claim 1, and 1) subjecting said coated mixture to sufficient energy to activate said photoinitiator and to crosslink said composition.

24. The process of claim 23 comprising the steps of a) partially crosslinking the novel composition to a coating viscosity of 500 to 10,000 cps, b) coating the partially crosslinked composition onto a substrate , and c) further crosslinking the composition.

* * * * *

UNITED STATES PATENT AND TRADEMARK OFFICE
CERTIFICATE OF CORRECTION

PATENT NO. : 6,664,306 B2
DATED : December 16, 2003
INVENTOR(S) : Gaddam, Babu N.

It is certified that error appears in the above-identified patent and that said Letters Patent is hereby corrected as shown below:

Column 20,
Line 43, between row 1 and row 2 of Table 2-continued insert -- 4-1-4 " 30 100 62 39 386 c --

Column 21,
Line 29, delete "60C" and insert in place thereof -- 60°C --

Signed and Sealed this

Twelfth Day of October, 2004

JON W. DUDAS
*Director of the United States Patent and Trademark Office*